US007768917B2

(12) United States Patent  
Nakayama et al.

(10) Patent No.: US 7,768,917 B2  
(45) Date of Patent: Aug. 3, 2010

(54) CONGESTION CONTROL SYSTEM, CONGESTION CONTROL METHOD, CONGESTION CONTROL PROGRAM, AND PROGRAM RECORDING MEDIUM

(75) Inventors: Yoshitarou Nakayama, Tokyo (JP); Hirotaka Yoshizu, Tokyo (JP); Kazuki Inoue, Tokyo (JP)

(73) Assignee: NEC Corporation, Tokyo (JP)

( * ) Notice: Subject to any disclaimer, the term of this patent is extended or adjusted under 35 U.S.C. 154(b) by 233 days.

(21) Appl. No.: 11/971,686

(22) Filed: Jan. 9, 2008

(65) Prior Publication Data

US 2008/0212482 A1    Sep. 4, 2008

(30) Foreign Application Priority Data

Jan. 11, 2007    (JP) ............................. 2007-003595

(51) Int. Cl.
  *H04L 12/26* (2006.01)
  *H04L 12/28* (2006.01)
  *H04L 12/56* (2006.01)
  *H04J 3/14* (2006.01)
  *H04L 12/64* (2006.01)

(52) U.S. Cl. ..................... 370/230.1; 370/235; 370/237; 370/204; 370/351; 709/221; 709/242; 709/244

(58) Field of Classification Search ......... 370/217–220, 370/229, 230, 230.1, 235, 236, 237, 254, 370/351, 352, 354; 709/244, 221, 242

See application file for complete search history.

(56) References Cited

U.S. PATENT DOCUMENTS

2002/0053029 A1 *    5/2002    Nakamura et al. .......... 713/201

(Continued)

FOREIGN PATENT DOCUMENTS

JP    1991096050 A    4/1991

(Continued)

OTHER PUBLICATIONS

Japanese Office Action issued Dec. 5, 2008 for JP Application No. 2007-003595.

(Continued)

*Primary Examiner*—Chi H Pham
*Assistant Examiner*—Ahmed Elallam

(57) ABSTRACT

In the present invention, a service network includes, when user terminals are divided by area, subscriber accommodation nodes that accommodate the user terminals present in the respective areas and relay nodes that perform relay of information among the subscriber accommodation nodes. The congestion control system further includes an edge router that routes a processing request for a communication service received from each of the user terminals to each of the subscriber accommodation nodes on the service network side as a control message and a congestion control server that controls congestion states of the subscriber accommodation nodes and the relay nodes. The subscriber accommodation node detects, when congestion occurs or it is likely that congestion occurs in the subscriber accommodation node because of a large number of control messages from the edge router, the occurrence of the congestion or the likelihood of occurrence of congestion and notifies the congestion control server to that effect. The congestion control server transmits a congestion control message for regulation to the edge router that routes the control message to the subscriber accommodation node, in which the congestion or the likelihood of occurrence of congestion has occurred, to thereby regulate an operation for routing the control message to the subscriber accommodation node, in which the congestion or the likelihood of occurrence of congestion has occurred, from the edge router.

18 Claims, 11 Drawing Sheets

U.S. PATENT DOCUMENTS

| | | |
|---|---|---|
| 2002/0118641 A1* | 8/2002 | Kobayashi .................. 370/230 |
| 2005/0047342 A1* | 3/2005 | Babiarz ...................... 370/232 |
| 2005/0102529 A1 | 5/2005 | Buddhikot et al. |
| 2005/0207358 A1 | 9/2005 | Nishida et al. |

FOREIGN PATENT DOCUMENTS

| | | |
|---|---|---|
| JP | 2001333114 A | 11/2001 |
| JP | 2004056726 A | 2/2004 |
| JP | 2004064135 A | 2/2004 |
| JP | 2004088666 A | 3/2004 |
| JP | 2005311596 A | 11/2005 |
| JP | 2007174047 A | 7/2007 |
| WO | 0152497 A2 | 7/2001 |

OTHER PUBLICATIONS

European Search Report for EP Application No. 08100060.6, dated Mar. 3, 2008.

* cited by examiner

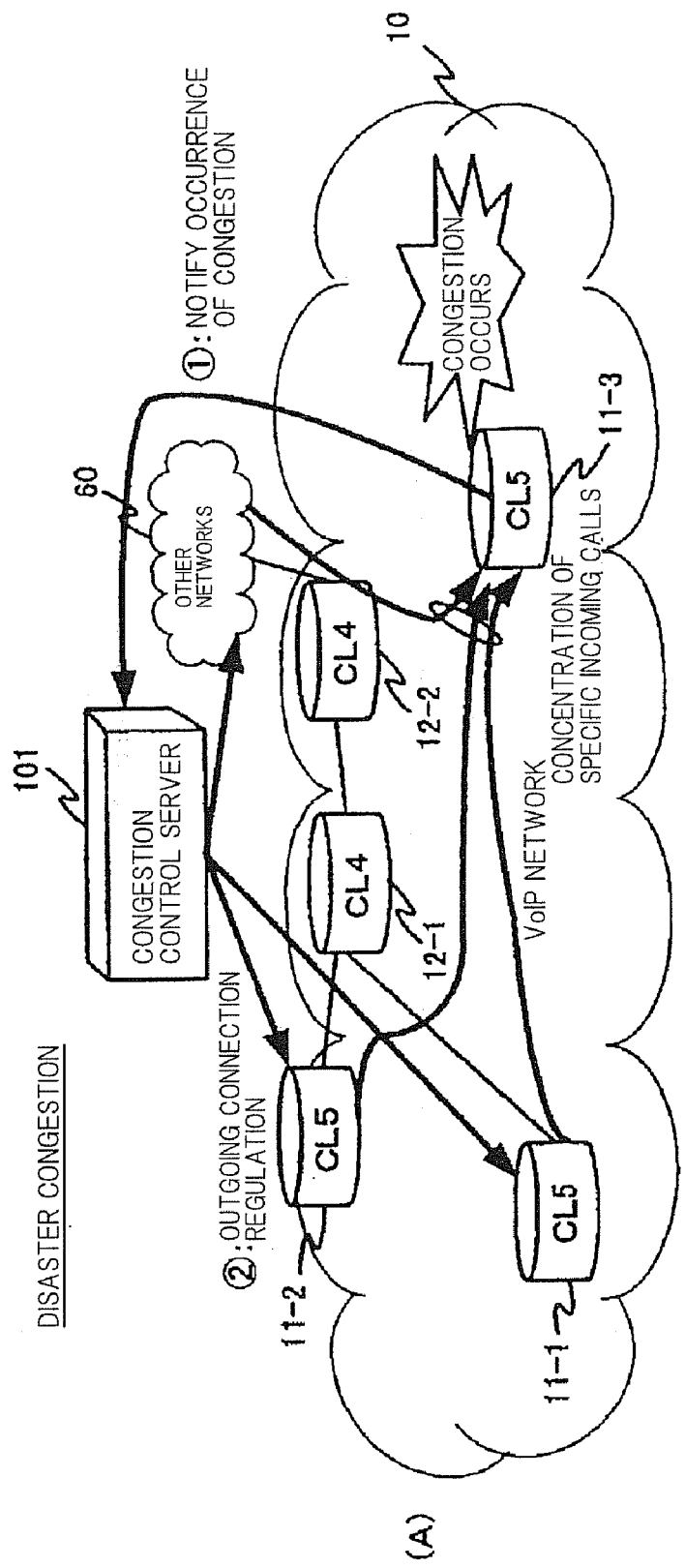

CONGESTION CONTROL SYSTEM, CONGESTION CONTROL METHOD, CONGESTION CONTROL PROGRAM, AND PROGRAM RECORDING MEDIUM

This application is based upon and claims the benefit of priority from Japanese patent application No. 2007-003595, filed on Jan. 11, 2007, the disclosure of which is incorporated herein in its entirety by reference.

BACKGROUND OF THE INVENTION

1. Field of the Invention

The present invention relates to a congestion control system, a congestion control method, a congestion control program, and a program recording medium, and, more particularly to a congestion control system, a congestion control method, a congestion control program, and a program recording medium for controlling traffic (communication amount) in an IP telephone system for providing a telephone communication service (VoIP (Voice over Internet Protocol)) through an IP network.

2. Description of the Related Art

When the IP telephone service for performing telephone communication through the IP network is realized, a CTI (Computer Telephony Integration) technique for integrating functions of a computer and a telephone is used. As a node (a component) configuring a service network on the IP network for providing such an IP telephone service, a CTI-GW (Gateway), a soft switch for performing line switching, and the like are used.

However, in the IP telephone service network (a telephone service network on the IP network), when a large number of calls to a specific incoming destination concentrate in the same period or when a large number of calls are originated from a specific outgoing source in the same period, it is likely that a large number of calls concentrate in a specific CTI-GW, congestion occurs, and a telephone communication function stops. When a large number of calls concentrate in the soft switch, it is likely that the soft switch itself stops. Besides, it is likely that functions of the entire IP telephone service stop.

For example, when control messages (call setting requests) are concentratedly originated from plural areas to a specific subscriber at a time, congestion occurs in a node that accommodates a user terminal of the subscriber. When congestion occurs in a certain node configuring the IP telephone service network, it is highly likely that the congestion sequentially propagates to adjacent nodes connected to the node to make the entire network unstable.

Therefore, for example, Japanese Patent Application Laid-Open No. 2004-88666 (hereinafter, Patent Document 1) proposes a mechanism for monitoring traffic (the number of calls) for each incoming destination per a unit time in order to eliminate occurring congestion or prevent occurrence of congestion for each node configuring an IP telephone service network and controlling, for the elimination of congestion or the prevention of occurrence of congestion, the number of connected calls to a specific incoming destination on the basis of density of the number of calls set in advance as a threshold.

The IP network that configures the service network for providing the telephone communication service on the IP network and provides the VoIP service has, in general, a configuration shown in FIG. 1.

FIG. 1 is a diagram showing an example of a configuration of the IP network for providing the VoIP service.

The IP network shown in FIG. 1 includes VoIP-U plane 90 that provides a user protocol between the IP network and a user terminal (a telephone terminal) and VoIP-C plane 10 that is a service network for an IP telephone for providing a control protocol for a VoIP call.

VoIP-U plane 90 is an IP network that connects user terminals 80 (80-1, 80-2, etc.) and formed by one layer of mesh-like topology. VoIP-U plane 90 is connected to a network of VoIP-C plane 10 through edge routers 15. Edge routers 15 are arranged to be distributed for each of areas decided in advance and connected to subscriber accommodation nodes CL5 11 (11-1, 11-2, etc.) for accommodating user terminals 80 (80-1, 80-2, etc.) in the area, respectively.

On the other hand, VoIP-C plane 10 is formed by topology of a route distributed system including two layers, i.e., a Local stage of plural subscriber accommodation nodes CL5 11 (11-1, 11-2, 11-3, etc.) and a Toll stage of relay nodes CL4 12 (12-1, 12-2, etc.) for relaying calls among subscriber accommodation nodes CL5 11 (11-1, 11-2, 11-3, etc.). Subscriber accommodation nodes CL5 11 and relay nodes CL4 12 cover user terminals in the areas, respectively.

Each of edge routers 15 is installed in association with each service provided on the IP network. When a request for a VoIP service is received from user terminal 80, VoIP-C plane 10 loads a control message for a call setting request from user terminal 80 on reception queue 16 for the VoIP service through edge router 15. According to the control message, VoIP-C plane 10 notifies the call setting request to subscriber accommodation node 11 (11-1) of the VoIP service network for accommodating user terminal 80 of the subscriber in the area. When VoIP-C plane 10 requests an IPTV service and other services, VoIP-C plane 10 is connected to C plane networks, which are service networks that realize the services, through edge routers 15 provided in association with the services, respectively.

When VoIP-C plane 10 performs network-to-network connection with PSTN (Public Switch Telephone Network) 50 and other networks 60, VoIP-C plane 10 connects certain relay node CL4 12 (12-1) of VoIP-C plane 10 and IGS (Interconnecting Gateway Switch) 51 of PSTN 50 and connects relay node CL4 12 (12-2) and gateways of other networks 60 to control incoming calls from PSTN 50 and other networks 60 or outgoing calls to PSTN 50 and other networks 60.

However, in the service network on the IP network in the past that provides a communication service such as the VoIP service, as shown in FIG. 1, various problems related to traffic on the communication service such as the VoIP service occur.

A first problem is that, when VoIP outgoing calls from plural user terminals 80 (80-1, 80-2, etc.) in a specific area are generated in a burst-like manner, it is highly likely that entire VoIP-C plane 10 for the VoIP service on the IP network falls into a congestion state.

This is because, when control messages for a large number of call setting requests are registered in reception queue 16 from edge router 15 in the area by burst traffic from plural user terminals 80 (80-1, 80-2, etc.) in the specific area, VoIP-C plane 10 does not have means for rejecting reception of the control messages for the call setting requests and repelling the control messages to user terminals 80 as request sources. As a result, a congestion state exceeding a processing ability of subscriber accommodation node CL5 11 (11-1) occurs. Consequently, the congestion spreads to relay node CL4 12 (12-1) connected to subscriber accommodation node CL5 11 (11-1). Moreover, the congestion state propagates to relay nodes CL4 12 and subscriber accommodation nodes CL5 11 beyond relay node CL4 12 (12-1) in succession. This leads to congestion in the entire network of VoIP-C plane 10.

Such a congestion problem in an originating system is a significant problem in the service network on the IP network that provides the VoIP service. A state of spread of congestion to the entire network of VoIP-C plane 10 is further explained with reference to FIG. 2.

FIG. 2 is a diagram for explaining a congestion spreading situation in an originating system node of the IP network that provides the VoIP service.

As described above, when control messages for call setting requests from edge router 15 in a specific area are registered in reception queue 16 as burst traffic at a time, subscriber accommodation node CL5 11-1 corresponding to edge router 15 attempts to process the large amount of call setting requests and falls into a congestion state. Subscriber accommodation node CL5 11-1 in the congestion state transmits processing requests for call setting to relay node CL4 12-1 one after another. Therefore, relay node CL4 12-1 adjacent to subscriber accommodation node CL5 11-1 also causes congestion.

Moreover, relay node CL4 12-1 transfers the processing requests for call setting to relay node CL4 12-2 adjacent thereto as a destination of routing to an incoming destination one after another. Therefore, relay node CL4 12-2 also causes congestion. Relay node CL4 12-2 transfers the processing requests for call setting to subscriber accommodation node CL5 11-2 as an incoming destination one after another. Therefore, subscriber accommodation node CL5 11-2 also causes congestion.

Furthermore, there is another problem. For example, in FIG. 2, as a routing method for transmitting control information for a certain area received by subscriber accommodation node CL5 11-2 to relay node CL4 12-2, a route bypass function of judging a congestion state of relay node CL4 12-2 and, when relay node CL4 12-2 is in a congestion state, automatically bypassing a route to another relay node CL4 12-4 is not provided. Therefore, because of a delay in a transfer operation between subscriber accommodation node CL5 11-2 and congesting relay node CL4 12-2, subscriber accommodation node CL5 11-2 also falls into a further congestion state. Similarly, in transfer of control information between relay nodes such as relay node CL4 12-2 and relay node CL4 12-1, a route bypass function of automatically bypassing a route to relay node CL4 12-3 without congestion is not provided. Therefore, because of a delay in a transfer operation between subscriber accommodation node CL5 11-2 and congesting relay node CL4 12-1, subscriber accommodation node CL5 11-2 falls into a further congestion state. Under the present situation, route bypassing in the VoIP network in the past is realized when the route bypassing is inputted by a maintenance person as a maintenance command. A function of detecting a congestion state and automatically bypassing a route is not provided.

In the VoIP network, in general, all control messages are received regardless a processing ability of a node. Therefore, because of an input of burst traffic, for example, regardless of a processing ability of subscriber accommodation node CL5 11-1, all control messages flow into subscriber accommodation node CL5 11-1 at a time and subscriber accommodation node CL5 11-1 suddenly falls into a congestion state. To recover from such sudden congestion, there is no method other than destroying all the control messages registered in reception queue 16 of subscriber accommodation node CL5 11-1 at a time according to a maintenance command of the maintenance person.

However, when all the control messages are destroyed at a time, even an in-speech call is forcibly disconnected. When a disconnection message registered in reception queue 16 is destroyed, a session cannot be normally closed. This is undesirable because accounting is affected. When subscriber accommodation node CL5 11 of the originating system once falls into a congestion state in this way, a significant problem occurs in that occurrence of a situation undesirable in terms of call control cannot be prevented and congestion propagates to the entire VoIP network, i.e., the entire network of VoIP-C plane 10.

A second problem is in that, because means for controlling traffic among nodes configuring VoIP-C plane 10 for the VoIP service is not provided, a situation in which a large amount of traffic concentrates in specific relay node CL4 12 or the like cannot be prevented and it is highly likely that a congestion state of entire VoIP-C plane 10 is caused.

This is because, since control means (regulating means) concerning a control message for processing request (e.g., a control message for a call setting request such as an INVITE message in an SIP protocol) to be transmitted and received is not provided between subscriber accommodation node CL5 11 and relay node CL4 12 and between relay nodes CL4 12, it is highly likely that processing requests concentrate in a specific node and the node falls into a congestion state. Moreover, in the technique in the past, for example, when control messages are concentratedly originated from plural areas through identical relay node CL4 12, relay node CL4 12 falls into a congestion state. When relay node CL4 12 in VoIP-C plane 10 on the IP network congests, there is a significant problem in that congestion propagates to other nodes connected to relay node CL4 12 and the entire network of VoIP-C plane 10 falls into a congestion state and becomes unstable.

A third problem is that, since regulating means for regulating input traffic from PSTN 50 and other networks is not provided for control of network-to-network connection calls, it is highly likely that traffic concentrates in specific relay node CL4 12 or the like to cause a congestion state of entire VoIP-C plane 10. Moreover, since means for solving a problem of collision of outgoing calls in network-to-network connection is not provided either, it is likely that not only a call setting operation for network-to-network connection calls is hindered but also congestion is caused by repeating exchange of processing requests between networks.

Since the other networks other than the VoIP network such as PSTN 50 cannot grasp a congestion situation of the VoIP network, it is likely that burst-like inflow of traffic into the VoIP network from the other networks occurs. When burst-like inflow of traffic concerning a call setting request (a VoIP outgoing call) from the other networks such as PSTN 50 occurs, appropriate regulation control cannot be realized only by traffic regulation only in VoIP-C plane on the IP network and it is likely that the entire network of VoIP-C plane falls into a congestion state. Therefore, input control means for regulating inflow of input traffic is indispensable for the other networks such as PSTN 50.

A fourth problem is that, since means for automatically regulating input traffic coming in a specific area is not provided, it is highly likely that traffic concentrates in specific subscriber accommodation node CL5 11 or the like on an incoming side to cause a congestion state of entire VoIP-C plane 10. Even when an event in which occurrence of congestion is predicted occurs (e.g., when a concert or a firework display is held or when it is likely that a disaster is caused by a typhoon or the like), VoIP-C plane 10 does not have means for automatically regulating an incoming call concerning the event. Therefore, VoIP calls to subscriber accommodation node CL5 11 in a specific area concentratedly occur and subscriber accommodation node CL5 11 falls into a congestion state. As a result, congestion spreads to respective nodes in entire VoIP-C plane 10.

Moreover, in the technique in the past, when the maintenance person performs maintenance, the maintenance person has to manually input a maintenance command for input regulation for preventing occurrence of congestion due to an event to subscriber accommodation node CL5 1 as an object of maintenance. However, it is likely that the maintenance person omits inputting the maintenance command for input regulation or inputs a wrong command and occurrence of congestion cannot be prevented. After the event ends, the maintenance person needs to manually input a maintenance command for releasing the input regulation. However, it is also likely that the maintenance person omits inputting such maintenance command for releasing the input regulation or inputs a wrong command and omission of release of the input regulation occurs.

In other words, in the technique in the past, when control messages to user terminal 80 of a specific subscriber are concentratedly originated from plural areas, subscriber accommodation node 11 that accommodates user terminal 80 of the subscriber cannot be prevented from congesting. When subscriber accommodation node 11 in VoIP-C plane 10 on the IP network congests, congestion propagates to other nodes connected to subscriber accommodation node 11, the entire network of VoIP-C plane 10 falls into a congestion state and becomes unstable.

Furthermore, the technique disclosed in Patent Document 1 is a technique for controlling, according to congestion to a specific incoming destination (a specific subscriber), density of the number of calls to be equal to or smaller than density of the number of calls corresponding to a threshold set in advance in the respective nodes. The technique is also a technique for regulating the number of calls only on node sides to uniformly control, for the respective nodes configuring the network, the number of calls to the nodes to be equal to or smaller than the threshold regardless of a contracted number of calls of a subscriber and the number of generated calls (generated traffic) in the past. Therefore, the technique is a congestion control method that spoils fairness with respect to the contracted number of calls of the subscriber and the number of generated calls in the past.

SUMMARY OF THE INVENTION

The present invention has been devised in view of the circumstances described above and it is an object of the present invention to provide a congestion control system, a congestion control method, a congestion control program, and a program recording medium that make it possible to prevent occurrence of congestion in respective nodes and eliminate occurring congestion by providing a congestion control server for controlling congestion in the respective nodes in a service network (e.g., a VoIP network in the case of a VoIP service) on an IP network for providing various communication services such as a VoIP service and a TVIP service.

A congestion control system according to the present invention is a congestion control system that controls, in a network configuration in which a service network for carrying out respective services is formed on an IP network for each of various communication services in order to perform the communication services through the IP network, congestion in the service network.

The service network has a two-layer structure including, when user terminals connected to the IP network are divided by area, subscriber accommodation nodes that accommodate the user terminals present in the respective areas and relay nodes that perform relay of information among the subscriber accommodation nodes. The congestion control system includes an edge router that routes a processing request for a communication service received from each of the user terminals to each of the subscriber accommodation nodes on the service network side, which accommodates the user terminal, as a control message and a congestion control server that controls congestion states of the subscriber accommodation nodes and the relay nodes.

The subscriber accommodation node detects, when congestion occurs or it is likely that congestion occurs in the subscriber accommodation node because of a large number of control messages from the edge router, the occurrence of the congestion or the likelihood of occurrence of congestion and notifies the congestion control server to that effect.

The congestion control server receives the notification and transmits a congestion control message for regulation for instructing the edge router that routes the control message to the subscriber accommodation node, in which the congestion or the likelihood of occurrence of congestion has occurred, to regulate an operation for routing a control message to thereby regulate the operation for routing the control message to the subscriber accommodation node, in which the congestion or the likelihood of occurrence of congestion has occurred, from the edge router.

A congestion control method according to the present invention is a congestion control method for controlling, in a network configuration in which a service network for carrying out respective services is formed on an IP network for each of various communication services in order to perform the communication services through the IP network, congestion in the service network.

The service network has a two-layer structure including, when user terminals connected to the IP network are divided by area, subscriber accommodation nodes that accommodate the user terminals present in the respective areas and relay nodes that perform relay of information among the subscriber accommodation nodes. The service network routes a processing request for a communication service received from one of the user terminals to the subscriber accommodation node on the service network side, which accommodates the user terminal, through an edge router as a control message.

The congestion control method includes instructing, when congestion occurs or it is likely that congestion occurs in the subscriber accommodation node because of a large number of control messages from the edge router, the edge router to regulate an operation for routing a control message to regulate the operation for routing the control message to the subscriber accommodation node, in which the congestion or the likelihood of occurrence of congestion has occurred, from the edge router.

A congestion control program according to the present invention carries out the congestion control method as a computer-executable program.

A program recording medium according to the present invention is a computer-readable recording medium having recorded therein the congestion control program.

According to the present invention, it is possible to realize effects described below.

In some case, a large number of processing requests are inputted to a service network (a VoIP network, etc.) on an IP network from one or plural user terminals in a certain area and congestion occurs in the service network or occurrence of congestion is predicted in the service network. In such a case, an operation for inputting a new control message for call setting request from an edge router interposed between a subscriber accommodation node of an originating system and a user terminal to the subscriber accommodation node is regulated. Guide information for requesting to wait for a new input of processing request as a request for congestion measures is notified from a media server to respective user terminals in the area. Consequently, it is possible to normally continue call processing in a range of a processing ability of the subscriber accommodation node without necessity of introducing a special mechanism for congestion measures and without forcibly disconnecting an in-speech call.

In some case, congestion occurs or occurrence of congestion is predicted in a certain relay node in a service network on an IP network. In such a case, it is possible to easily transfer a control message from a relay node or a subscriber accommodation node bypassing the relay node, in which congestion occurs or occurrence of congestion is predicted, simply by adding a route selecting function to a layer at a higher level of an IP protocol corresponding to the service network without changing a transfer control layer of an existing general-purpose IP protocol. It is also possible to normally continue call processing concerning a new outgoing call or an in-speech call.

In some case, a node on the service network side on the IP network that connects the service network to other networks such as a PSTN network congests. In such a case, it is possible to notify the other networks that the node is in a congestion state and regulate a large number of control messages for a processing request from flowing into the service network on the IP network from by other networks by controlling, according to a congestion situation, an operation for unloading a control message from a reception queue for capturing control messages for a processing request from the other networks, disconnecting a link for connecting the service network with the other networks, or disconnecting the link only during a fixed time decided in advance. Therefore, even if the other networks are connected to the service network on the IP network, it is possible to stably operate the service network on the IP network.

A congestion control apparatus that can import and export information concerning congestion between the congestion control apparatus and a congestion control server in the service network on the IP network is arranged in the other networks such as a PSTN network connected to the service network on the IP network. This makes it possible to perform end-to-end flow control even in the network-to-network connection with the other networks, whereby it is possible to regulate a large amount of traffic exceeding a processing ability of the service network on the IP network from flowing in from the other networks side. Therefore, even when it is likely that congestion due to a disaster or congestion due to planning of an event such as a concert occurs, it is possible to prevent the service network from falling into a congestion state because of traffic from the other networks side and stably operate the service network on the IP network.

In some case, congestion occurs or occurrence of congestion is predicted in a subscriber accommodation node or a relay node configuring the service network on the IP network. In such a case, the number of control messages transmitted to the subscriber accommodation node or the relay node is regulated (a regulation amount is controlled) according to an amount of traffic in the past to the subscriber accommodation node or the relay node or according to amounts of traffic to the subscriber accommodation node or the relay node in contracts with respective subscribers. Consequently, in subscriber accommodation nodes in respective areas, it is possible to uniformalize probabilities (regulation ratios) of control messages transmitted to a specific node, in which congestion occurs or likely to occur, being regulated and it is possible to carry out fair traffic control for the respective subscribers.

Subscriber accommodation nodes are divided in plural areas and arranged in association with the respective areas. Subscriber accommodation nodes and relay nodes as congestion control objects are limited on the basis of topology information among the subscriber accommodation nodes arranged in association with the respective areas. Consequently, even when the service network on the IP network is increased in size, it is possible to narrow down subscriber accommodation nodes or relay nodes as regulation objects and reduce a load for congestion control.

When congestion occurs, regulation is carried out in the respective subscriber accommodation nodes in the respective areas as entrances to the service network on the IP network. Consequently, a node in congestion can recover from a congestion state early. Further, it is possible to prevent congestion from expanding into the service network on the IP network and stably operate the service network on the IP network.

When an occurrence period of congestion in a node in the service network on the IP network is predicted in advance, congestion control is performed with a period designated. Consequently, it is possible to prevent the node or the service network on the IP network from falling into a congestion state by automatically executing outgoing connection regulation for regulating an operation for transmitting a control message to respective nodes in the service network on the IP network before the node congests. Further, it is possible to prevent a maintenance person from omitting input of a regulation command, inputting a wrong command, or omitting release of the regulation by automatically carrying out regulation and release the regulation according to a regulation start date and time and a regulation end date and time.

When congestion occurs or occurrence of congestion is predicted in a node in the service network on the IP network, a regulation destination indicating a transmission source node that should regulate transmission of a control message to the node, an amount of regulation that should be performed, or the number of control messages that can be transmitted after regulation is registered in advance as a template for congestion control. Consequently, it is possible to immediately carry out an appropriate congestion control operation against occurrence of an extremely urgent event.

Moreover, in some case, a communication failure occurs in a link that connects a congestion control server that manages the respective nodes in the service network on the IP network and performs congestion control and a control object node. Even in such a case, the congestion control server has an audit function of transferring, when the communication failure of the link is restored, a congestion control state set in the node and matching a state of the node side with a congestion control state managed on the congestion control server side. Therefore, even if a communication failure occurs between the congestion control server and the node, it is possible to immediately match congestion control states thereof at a point when the communication failure is restored.

Furthermore, in some case, a failure significantly affecting an operation such as excess of a usage rate of a CPU, exhaustion of a memory resource, or a failure of hardware occurs in a node in the service network on the IP network. Even in such a case, it is possible to immediately regulate transmission of a control message to the node. When the service network is formed by network topology in which the node is connected to plural adjacent nodes, it is possible to control a transfer route of a control message through the node to be bypassed to another node. Therefore, it is possible to reduce likelihood of loss of the control message due to a failure and maintain a quality of a communication service at a stable level.

The above and other objects, features, and advantages of the present invention will become apparent from the following description with reference to the accompanying drawings which illustrate examples of the present invention.

BRIEF DESCRIPTION OF THE DRAWINGS

FIGS. 9A and 9B are diagrams for explaining operations in a sixth embodiment of the congestion control system according to the present invention.

DESCRIPTION OF THE PREFERRED EMBODIMENTS

Exemplary embodiments of a congestion control system, a congestion control method, a congestion control program, and a program recording medium according to the present invention will be hereinafter explained with reference to the accompanying drawings. In the explanation of the embodiments, as an example of a service network on an IP network, a VoIP network for transferring telephone sound information is explained. However, the present invention is not limited to this. In the present invention, the service network on the IP network may be a network for transferring image and video information or television information, may be a network for transferring any kind of information including sound, text, and program information, and may be a network for treating multimedia in which these kinds of information are mixed. The present invention realizes a mechanism for effectively controlling congestion in the service network on the IP network corresponding to various kinds of communication services.

In the following explanation, a congestion control system and a congestion control method for controlling congestion in a VoIP network are mainly explained. According to this explanation, it is possible to easily arrive at an idea that the congestion control method can also be carried as a congestion control program carried out as a computer-executable program or a program recording medium obtained by recording the congestion control program in a computer-readable recording medium such as an optical disk or an FD. Therefore, explanation of a congestion control program and a program recording medium according to the present invention is omitted.

Configuration of Embodiments

First, an example of a system configuration of a congestion control system according to the present invention is explained with reference to FIG. 3.

Figure 1:
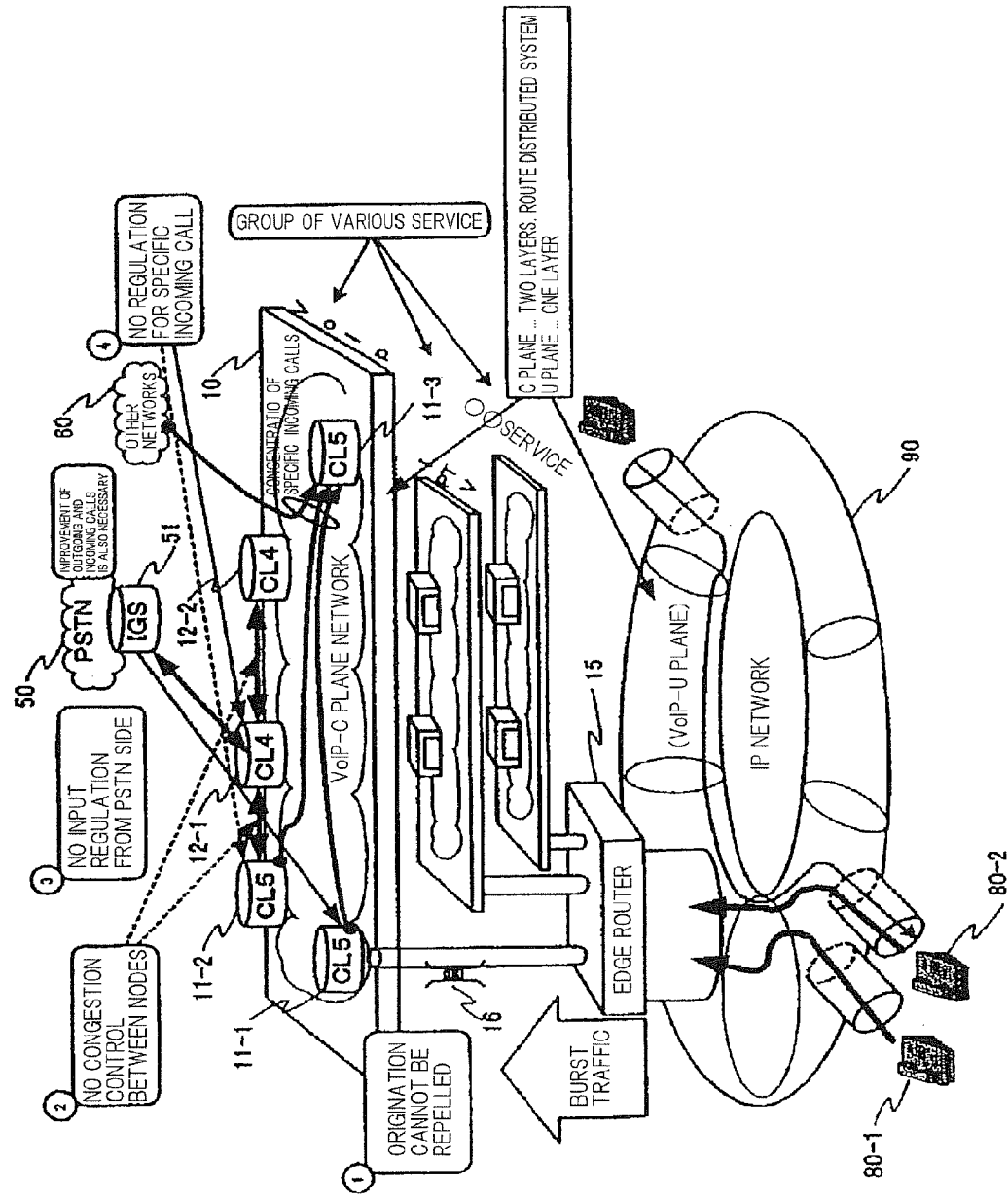
FIG. 1 is a network configuration diagram showing an example of a configuration of an IP network that provides a VoIP service.
Figure 2:
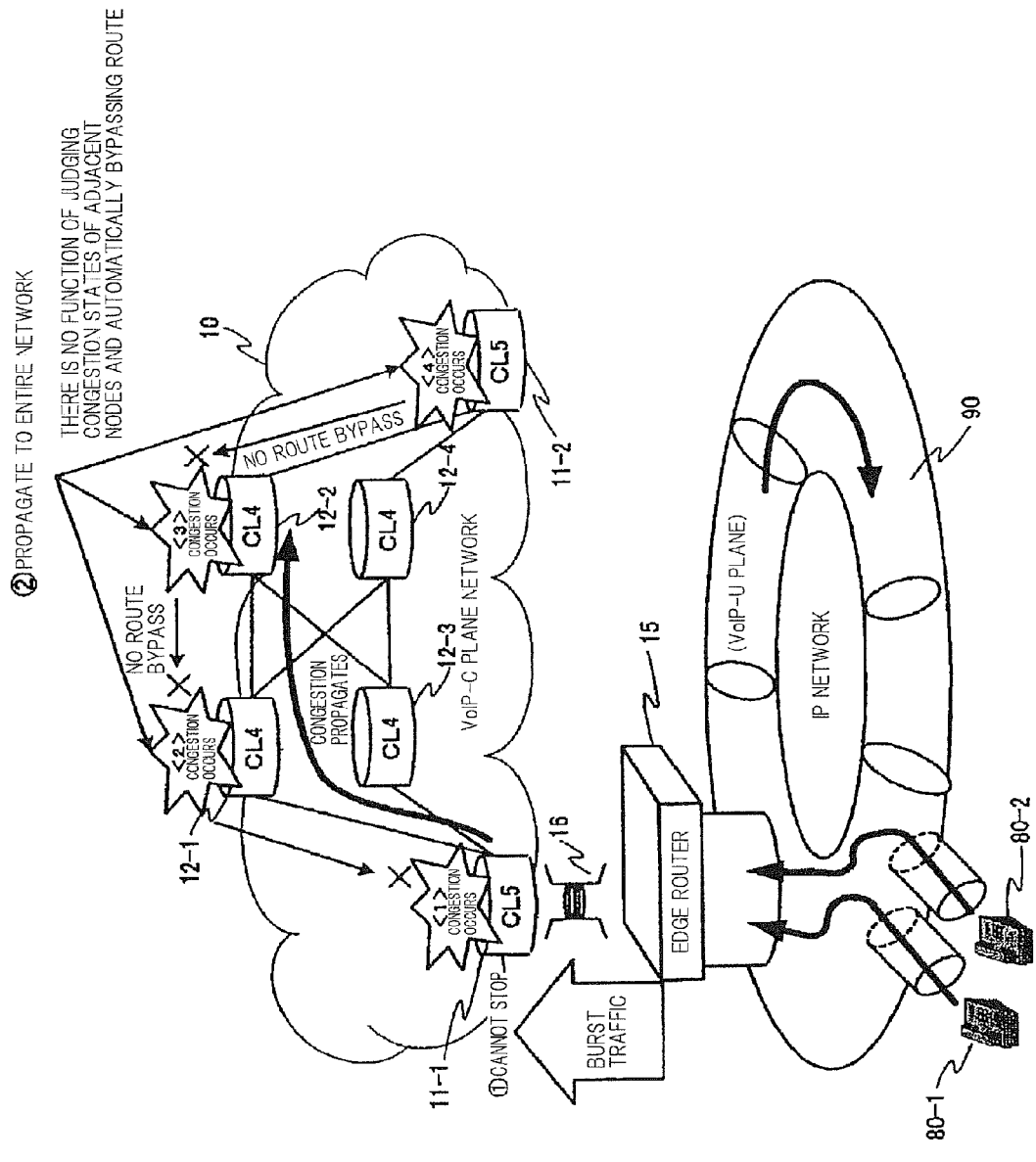
FIG. 2 is a diagram for explaining a spreading state of congestion in originating system nodes of the IP network that provides the VoIP service.
Figure 3:
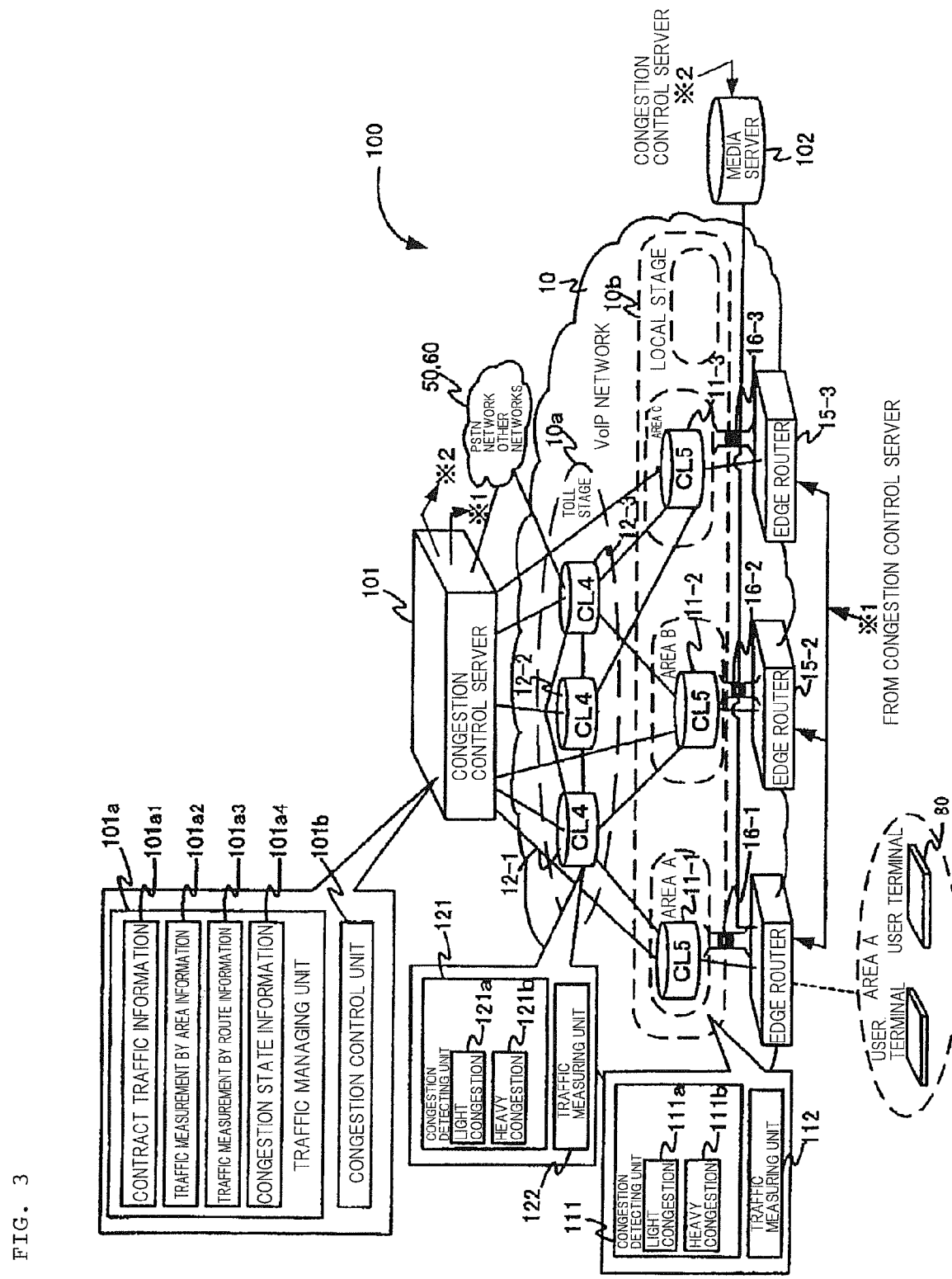
FIG. 3 is a system configuration diagram showing an example of a system configuration of a congestion control system according to the present invention.

In congestion control system 100 shown in FIG. 3, VoIP-C plane 10 of the IP network shown in FIG. 1 is shown as VoIP network 10. Congestion control system 100 further includes congestion control server 101 for controlling congestion in VoIP network 10 and media server 102 that outputs various kinds of multimedia information (sound information, text information, image information, etc.) for congestion measures. In the example shown in FIG. 3, congestion control server 101 and media server 102 are arranged as different servers. However, congestion control server 101 and media server 102 may be an identical server.

VoIP network 10 includes, like VoIP-C plane 10 shown in FIG. 1, two layers, i.e., Toll stage 10a that forms a relay network including relay nodes CL4 12 (12-1, 12-2, 12-3, etc.) and Local stage 10b that forms a local network that accommodates user terminals 80 (same as user terminals 80 shown in FIG. 1) of subscribers in each of areas including subscriber accommodation nodes CL5 11 (11-1, 11-2, 11-3, etc.). In VoIP network 10, traffic related to sound information is circulated using topology of a route distributed system.

Respective subscriber accommodation nodes CL5 11 configuring VoIP network 10 are arranged by area. Edge routers 15 for performing routing control between VoIP network 10 and an IP network, i.e., a VoIP-U plane, to which user terminals 80 of the subscribers are directly connected, are connected to respective subscriber accommodation nodes CL5 11 as external highway apparatuses for VoIP network 10.

Relay nodes CL4 12 configuring VoIP network 10 are connected to PSTN network 50 and other networks 60 by a gateway line for network-to-network connection.

Congestion control server 101 is connected to all nodes configuring VoIP network 10, i.e., relay nodes CL4 12 (12-1, 12-2, 12-3, etc.) and subscriber accommodation nodes CL5 11 (11-1, 11-2, 11-3, etc.).

Congestion control server 101 collects traffic information, congestion occurrence information, and congestion escape information from the respective nodes and transmits control information for controlling occurrence of congestion and control information for eliminating occurring congestion to the respective nodes as a congestion control message.

Congestion control server 101 stores in advance network topology information and session routing information indicating a transfer path of a control message among the respective nodes in VoIP network 10, contract traffic information of traffic contracted with the respective subscribers, various kinds of setting information for congestion control (various kinds of control information including a threshold for discriminating congestion states of the respective nodes and a congestion occurrence period in the case in which occurrence of congestion is predicted), and the like.

Congestion control server 101 includes at least traffic managing unit 101a that manages information concerning traffic (e.g., the number of control messages for outgoing calls, responses, and disconnection) processed by the respective nodes such as relay nodes CL4 12 and subscriber accommodation nodes CL5 11 and congestion control unit 101b that transmits and receives a congestion control message between congestion control server 101 and the respective nodes.

Traffic managing unit 101*a* is a unit that appropriately calculates and manages information concerning traffic and occurrence and elimination of congestion by area and by route on the basis of traffic information transmitted from the respective nodes such as relay nodes CL4 12 and subscriber accommodation nodes CL5 11 at each period decided in advance. Traffic managing unit 101*a* includes at least contract traffic information 101*a*1, traffic measurement by area information 101*a*2, traffic measurement by route information 101*a*3, and congestion state information 101*a*4.

Contract traffic information 101*a*1 accumulates required traffic amounts, which are to be processed in a unit time, concerning respective subscriber accommodation nodes CL5 11 calculated on the basis of contract traffic contents including the number of calls (density of the number of calls) that can be transmitted and received by each of the respective subscribes per a unit time.

Traffic measurement by area information 101*a*2 accumulates an amount of traffic per a unit time transmitted and received among subscriber accommodation nodes CL5 11 arranged for the respective areas.

Traffic measurement by route information 101*a*3 accumulates an amount of traffic per a unit time transmitted and received by route of the respective nodes such as relay nodes CL4 12 and subscriber accommodation nodes CL5 11.

Congestion state information 101*a*4 accumulates congestion occurrence information and congestion escape information received from the respective nodes such as relay nodes CL4 12 and subscriber accommodation nodes CL5 11 and a congestion state (heavy congestion, light congestion, a congestion occurrence prediction period inputted from a maintenance person in advance, etc.) discriminated by congestion control unit 101*b*.

Congestion control unit 101*b* detects, on the basis of traffic information (including congestion occurrence information and congestion escape information) of the respective nodes managed by traffic managing unit 101*a*, or on the basis of a state of the link connecting the respective nodes whether the respective nodes are in a load state indicating a sign of fall into congestion or in a load state indicating fall into congestion.

When a sign of fall into congestion is detected, congestion control unit 101*b* judges that light congestion occurs. When a congestion occurrence prediction period is registered in advance, congestion control unit 101*b* transmits, at a point when the prediction period is reached, transmits a congestion control message for controlling an inflow amount of traffic to be processed and suppressing occurrence of congestion to a node as a congestion control object. On the other hand, when it is detected that a node has fallen into congestion, congestion control unit 101*b* judges that heavy congestion occurs and transmits, to respective nodes around a node as a congestion control object, a congestion control message for regulating traffic transmitted to the respective nodes or a congestion control message for causing the respective nodes to perform bypass routing not through the node and controls further inflow of traffic to the node.

When a sign of occurrence of congestion in subscriber accommodation node CL5 11 is detected or occurrence of congestion is detected, congestion control server 101 causes edge router 15 to perform a congestion regulating operation for suppressing further inflow of a call setting request control message to subscriber accommodation node CL5 11 and transmits, to media server 102, a congestion control message for instructing user terminals 80 to output guide information (a message for requesting to wait for a new input of traffic) using various media for congestion measures. When a sign of occurrence of congestion in relay accommodation nodes CL4 12 (in the case of FIG. 3, relay node CL4 12-3) connected to PSTN network 50 and other networks 60 is detected or occurrence of congestion is detected, congestion control server 101 transmits a congestion control message for requesting outgoing connection regulation to gateway apparatuses and congestion control apparatuses (traffic control apparatuses) of PSTN network 50 and other networks 60 to prevent the apparatuses from transmitting new control information for network-to-network connection request.

On the other hand, media server 102 is connected to congestion control server 101. Media server 102 is also connected to edge routers 15 (15-1, 15-2, 15-3, etc.) that are arranged in the respective areas and route control messages for processing request, which are inputted from user terminals in corresponding areas to VoIP network 10, to VoIP network 10. When a congestion control message is received from congestion control server 101, media server 102 outputs various kinds of guide information for congestion measures (e.g., in the case of sound information, a sound guidance for elimination of congestion such as "it is difficult to make connection at the moment, please call after a short while.") to the user terminals according to instruction content of the congestion control message.

Each of subscriber accommodation nodes CL5 11 includes congestion detecting unit 111 that detects congestion and notifies congestion control server 101 to that effect and traffic measuring unit 112 that measures and collects traffic information such as a total number of control messages treated for each unit time decided in advance and the number of control messages by area and by route and notifies congestion control server 101 of the traffic information at each period decided in advance. Congestion detecting unit 111 includes light congestion detecting unit 111*a* that detects a sign of occurrence of congestion and heavy congestion detecting unit 111*b* that detects occurrence of congestion (heavy congestion). In FIG. 3, only subscriber accommodation node CL5 11-1 is shown. However, other subscriber accommodation nodes 11 (11-2, 11-3, etc.) include congestion detecting units 111 and traffic measuring units 112 in completely the same manner.

Each of relay nodes CL4 12 includes congestion detecting unit 121 that detects congestion and notifies congestion control server 101 to that effect and traffic measuring unit 122 that measures and collects traffic information such as a total number of control messages treated for each unit time decided in advance and the number of control messages by area and by route and notifies congestion control server 101 of the traffic information at each period decided in advance. Congestion detecting unit 121 includes light congestion detecting unit 121*a* that detects a sign of occurrence of congestion and heavy congestion detecting unit 121*b* that detects occurrence of congestion (heavy congestion). In FIG. 3, only relay node CL4 12-1 is shown. However, other relay nodes 12 (12-2, 12-3, etc.) include congestion detecting units 121 and traffic measuring units 122 in completely the same manner.

When heavy congestion is detected by heavy congestion detecting units 111*b* of subscriber accommodation nodes CL5 11 and heavy congestion detecting units 121*b* of relay nodes CL4 12, depending on a situation of congestion, an operation itself for notifying congestion control server 101 of occurrence of congestion may not be able to be performed. When heavy congestion, which cannot be notified to congestion control server 101, occurs in this way, an operation system and a standby system are provided as subscriber accommodation nodes. When the operation system comes into an excessively large load state and cannot notify congestion control server 101 of occurrence of congestion as a notification message, the operation system is switched to the standby system. The standby system notifies congestion control server 101 that the system is switched because of occurrence of congestion. Congestion control server 101 receives the notification and instructs the other subscriber accommodation node to regulate inflow of control data into the congesting node. When the subscriber accommodation node recovers from a congestion state, the subscriber accommodation node notifies congestion control server 101 of the recovery from the congestion state. Congestion control server 101 receives the notification and instructs the other subscriber accommodation node to release the regulation.

Specific embodiments of congestion control system 100 shown in FIG. 3 are further explained.

First Embodiment

In the embodiment described above, an example of an operation for regulating transmission of a control message to subscriber accommodation node CL5 11 of the originating system that has fallen into a light congestion state or a heavy congestion state is explained with reference to FIG. 4.

Figure 4:
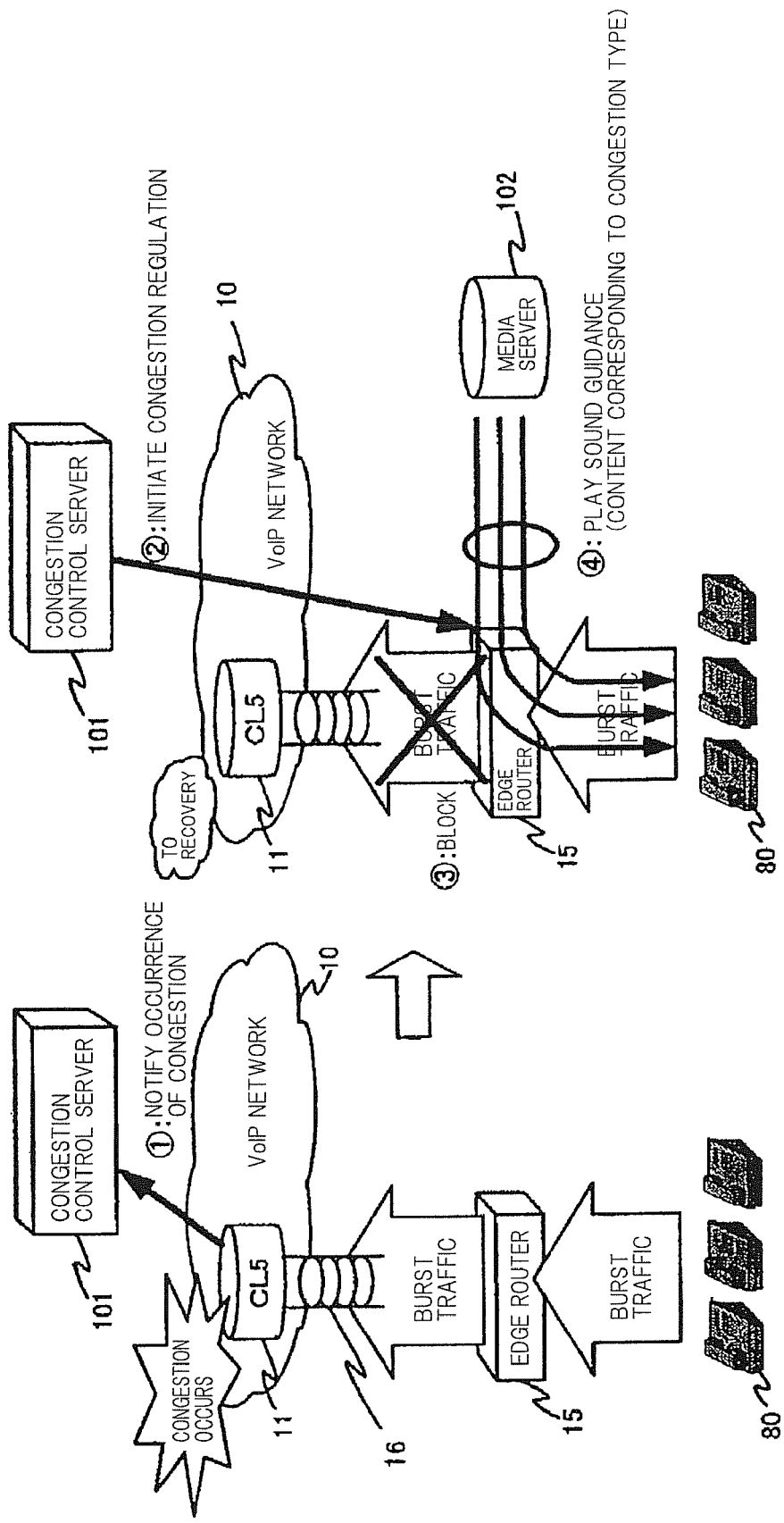
FIG. 4 is a diagram for explaining operations in a first embodiment of the congestion control system according to the present invention.

FIG. 4 is a diagram for explaining operations in a first embodiment of congestion control system 100 according to the present invention. Specifically, FIG. 4 is a diagram for explaining an example of an operation for regulating, when it is detected that subscriber accommodation node CL5 11 is in a congestion sign state or has fallen into a congestion state, registration of a control message for call setting request concerning a new outgoing call among control messages to be registered in reception queue 16 of subscriber accommodation node CL5 11 from edge router 15 and suppressing a new originating call of user terminal 80.

In the VoIP network in the past, as described above, the mechanism for immediately registering, regardless of a processing ability of a node that receives a processing request, a control message in a reception queue of the node every time a processing request is generated and requesting execution of processing is adopted. Therefore, when a large number of processing requests are generated in a burst-like manner, because of burst traffic (a large number of processing requests), all control messages flow in at a time regardless of whether the node can perform processing and the node instantaneously falls into a congestion state.

To recover from such sudden congestion, there is no method other than destroying all the control messages registered in the reception queue of the node. In that case, when a message for call registered in the reception queue is destroyed, a call in a speech state is disconnected. When a disconnection message registered in the reception queue is destroyed, a session cannot be normally closed.

It is impossible to prevent significant influence on accounting. The embodiment shown in FIG. 4 indicates an example for solving such a problem in the past. In this embodiment, an apparatus that is located between subscriber accommodation node CL5 11 and user terminal 80 and registers a processing request to subscriber accommodation node CL5 11, i.e., edge router 15 dynamically blocks new traffic (i.e., new call setting request) from user terminal 80 according to a congestion situation in subscriber accommodation node CL5 11. Consequently, subscriber accommodation node CL5 11 can escape from a congestion sign state or a congestion state and surely process a control message already received.

A procedure of execution in the diagram shown in FIG. 4 is as described below. Congestion control server 101 that concentratedly monitors congestion situations of subscriber accommodation node CL5 11 and relay node CL4 12 configuring VoIP network 10, subscriber accommodation node CL5 11 and relay node CL4 12, and edge router 15 as an intermediate apparatus operate in cooperation with one another as explained with reference to FIG. 3.

As shown on the left in FIG. 4, when subscriber accommodation node CL5 11 arranged in a certain area falls into a state of load exceeding a threshold for detecting a congestion sign state because of new originating calls of user terminals 80 of one or plural subscribers present in the area, light congestion detecting unit 111*a* detects occurrence of light congestion and notifies congestion control server 101 to that effect. When subscriber accommodation node CL5 11 falls into a state of load exceeding a threshold for detecting occurrence of a heavy congestion state, heavy congestion detecting unit 111*b* detects occurrence of heavy congestion and notifies congestion control server 101 to that effect. An operation itself for notifying congestion control server 101 of occurrence of heavy congestion may be unable to be carried out because of inflow of a large amount of traffic. In such a case, an operation system and a standby system are provided as subscriber accommodation nodes, the operation system is switched to the standby system. The standby system notifies congestion control server 101 that the system is switched because of occurrence of congestion. Congestion control server 101 receives the notification and instructs the other subscriber accommodation node to regulate inflow of control data to the congesting node. When the subscriber accommodation node recovers from a congestion state, the subscriber accommodation node notifies congestion control server 101 of the recovery from the congestion state. Congestion control server 101 receives the notification and instructs the other subscriber accommodation nodes to release the regulation.

Congestion control server 101 receives notification of occurrence of light congestion in a congestion sign state and heavy congestion from subscriber accommodation node CL5 11 and registers to that effect in congestion state information 101*a*4 using traffic managing unit 101*a*. As shown on the right in FIG. 4, congestion control server 101 transmits a congestion control message for instructing edge router 15, which is connected to subscriber accommodation node CL5 11, to suppress registration of a control message for requesting subscriber accommodation node CL5 11 to process a new originating call in reception queue 16 of subscriber accommodation node CL5 11.

Congestion control server 101 transmits a congestion control message for instructing media server 102 to output guide information (e.g., sound guidance such as "the line is busy at the moment, please call again after a short while") to user terminals 80 of the subscribers accommodated in subscriber accommodation node CL5 11 using various media for congestion prevention including content corresponding to the present congestion state.

The external highway apparatus, i.e., edge router 15 receives the congestion control message from congestion control server 101, dynamically blocks an operation for registration in reception queue 16, and suppresses an operation for registering a control message for requesting processing of a new outgoing call in reception queue 16. In this case, edge router 15 registers a control message for call concerning an in-speech call and a control message for disconnection in reception queue 16. This makes it possible to save the in-speech call and normally perform a disconnection operation for the in-speech call. On the other hand, media server 102 receives the congestion control message from congestion control server 101 and outputs multimedia information for congestion prevention indicated by the congestion control message to respective user terminals 80 through edge router 15. Consequently, new originating calls from user terminals 80 are suppressed.

By carrying out such a congestion control operation, light congestion detecting unit 111a or heavy congestion detecting unit 111b detects that subscriber accommodation node CL5 11 could escape from the light congestion state or the heavy congestion state. Then, light congestion detecting unit 111a and heavy congestion detecting unit 111b notify congestion control server 101 to that effect. Congestion control server 101 receives information concerning the escape from the congestion state and registers to that effect in congestion state information 101a4 using traffic managing unit 101a. Further, congestion control server 101 transmits a congestion control message for instructing edge router 15, which is connected to subscriber accommodation node CL5 11, to release the operation for regulating input of a new control message for call setting request to subscriber accommodation node CL5 11. As a result, edge router 15 is restored to a normal state for registering, when control messages are received from user terminals 80, all control messages including the new control message for call setting request in reception queue 16.

In general, light congestion detecting unit 111a or heavy congestion detecting unit 111b uses, as a threshold for congestion escape for discriminating whether subscriber accommodation node CL5 11 could escape from the light congestion state or the heavy congestion state, a value lower than a threshold for congestion detection for discriminating whether the light congestion state or the heavy congestion state has occurred. Light congestion detecting unit 111a or heavy congestion detecting unit 111b releases the congestion state only when it is detected that a load has fallen into a load state lighter than a load state at the time of occurrence of the congestion state. Consequently, a situation in which a congestion state and a normal state repeatedly occur frequently is prevented.

Regardless of whether information concerning escape from a congestion state is received from subscriber accommodation node CL5 11, congestion control server 101 may transmit a congestion control message for instructing edge router 15 to release the operation for regulating a control message for an outgoing call every time a fixed time decided in advance elapses. In this case, an operation for notifying congestion release information from subscriber accommodation node CL5 11 to congestion control server 101 is unnecessary. On the other hand, when subscriber accommodation node CL5 11 has not escaped from the congestion state, the congestion control operation described above is repeated.

By applying the congestion control method described in this embodiment, it is unnecessary to introduce a special mechanism for congestion measures on user terminals 80 side and an in-speech call is not forcibly disconnected. It is possible to normally continue call processing in a range of a processing ability of subscriber accommodation node CL5 11.

Second Embodiment

An example of an operation for bypassing a route of a control message to relay node CL4 12 that has fallen into a light congestion state or a heavy congestion state is explained with reference to FIG. 5.

Figure 5:
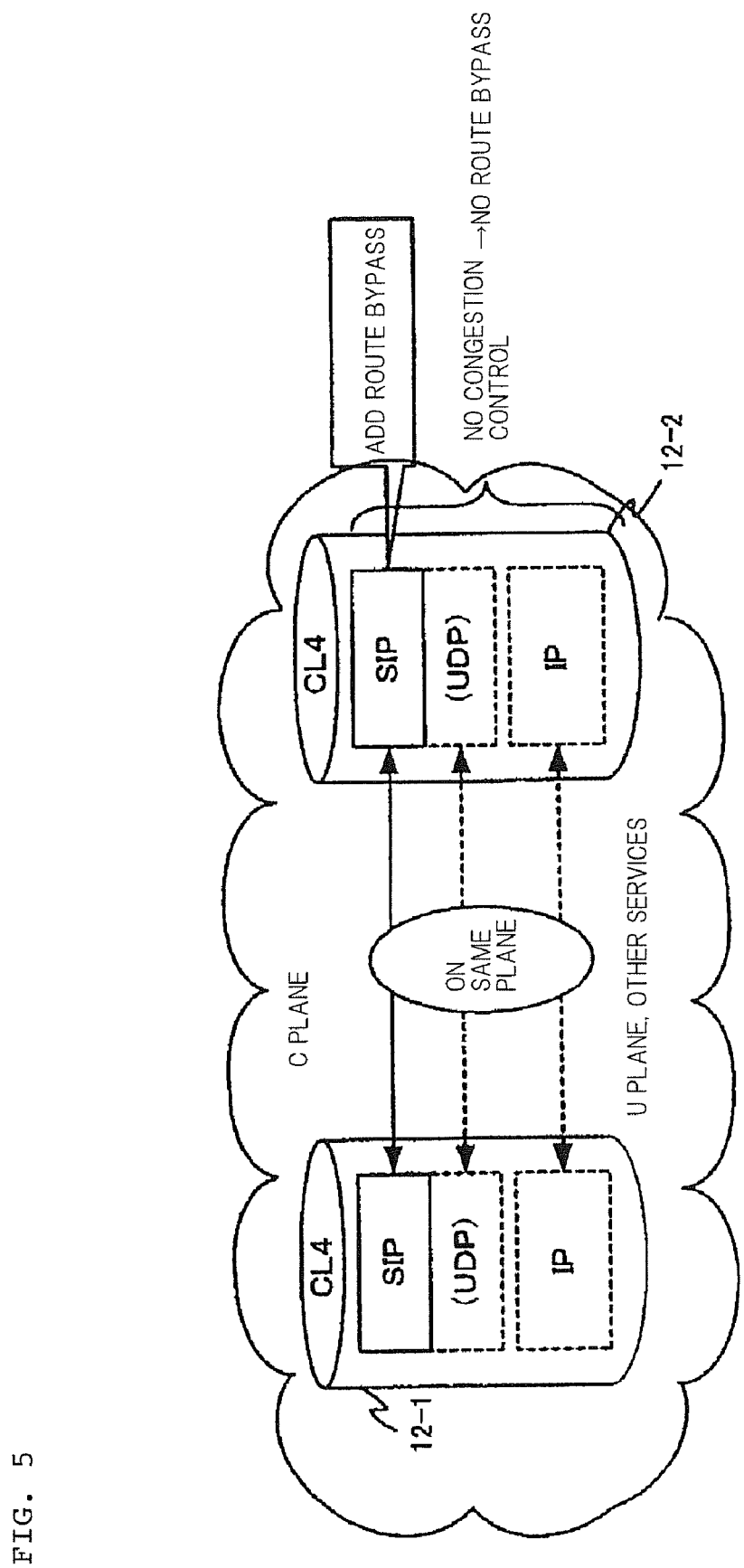
FIG. 5 is a diagram for explaining operations in a second embodiment of the congestion control system according to the present invention.

FIG. 5 is a diagram for explaining an operation of a second embodiment of congestion control system 100 according to the present invention. In FIG. 5, for example, when it is detected that relay node CL4 12-1 shown in FIG. 3 is in a congestion sign state or has fallen in a congestion state, an operation for suppressing further generation of a load on relay node CL4 12-1 by bypassing a control message to relay node CL4 12-1 to another relay node CL4 12-2 is performed. This operation is explained with a case in which an SIP (Session Initiation Protocol) is adopted as a protocol for call control of a VoIP network as an example.

In the VoIP network in the past, a control message for processing request is fixedly routed and transmitted to a node in a specific route decided in advance as a route distributed system. As shown in FIG. 5, in a form in which both relay node CL4 12-1 and relay node CL4 12-2 are placed on a general-purpose IP network as a VoIP-C plane for an IP telephone, a congestion control function at a protocol level is not implemented. Means for performing control concerning transmission and reception operations for a control message for processing request (e.g., an INVITE message in the SIP protocol) transmitted and received between relay node CL4 12-1 and relay node CL4 12-2 is not provided either.

Therefore, regardless of a processing ability of relay node CL4 12-1 that receives a control message, relay node CL4 12-2 immediately registers, every time a control message of a processing request is generated, the control message in a reception queue of relay node CL4 12-1 decided in advance as a routing destination of the control message and requests execution of processing. As a result, when a large number of processing requests to specific relay node CL4 12-1 are generated in a burst-like manner, regardless of whether relay node CL4 12-1 can perform processing, all control messages as inputs of burst traffic (a large number of processing requests) flow in at a time and relay node CL4 12-1 instantaneously falls into a congestion state. Such a problem is completely the same between subscriber accommodation node CL5 11 and relay node CL4 12.

In the technique in the past, as described above, when control messages through identical relay node CL4 12 are concentratedly originated from plural areas, relay node CL4 12 falls into a congestion state. When relay node CL4 12 in VoIP-C plane 10 of the IP network congests, there is a significant problem in that congestion propagates to other nodes connected to relay node CL4 12 and the entire network of VoIP-C plane 10 falls into a congestion state and becomes unstable.

In this embodiment, as shown in FIG. 5, as a route selecting function, for example, a function same as a trunk group selecting function (TGN/TGX function) adopted in a NO7 common channel signaling system in a PSTN network is added to a layer of a higher-order SIP protocol for carrying out processing for a VoIP call as a service network for VoIP rather than a basic transfer control layer of an IP protocol for performing basic control as an IP network such as a VoIP-U plane shared with other services. Therefore, a function of making it possible to perform route bypassing is added. Consequently, for example, when it is notified to congestion control server 101 that relay node CL4 12-1 has fallen into a congestion state, congestion control server 101 transmits, to other nodes such as an adjacent node (in the case of FIG. 5, relay node CL4 12-2), a congestion control message for instructing respective nodes (in the case of FIG. 5, relay node CL4 12-2) adjacent to relay node CL4 12-1 to bypass-transfer a control message, which is transmitted to relay node CL4 12-1, to another relay node CL4 12 selected as a route for bypass.

The respective nodes (in the case of FIG. 5, relay node CL4 12-2) receive the congestion control message from congestion control server 101 and, thereafter, perform a routing operation for transferring a control message to the designated route for bypass. The respective nodes perform an operation for transferring, every time a control message to relay node CL4 12-1 is received, the control message to relay node CL4 12 set as a substitute route using the route selecting function of the SIP protocol.

By carrying out such a congestion control operation, when light congestion detecting unit 121a or heavy congestion detecting unit 121b detects that relay node CL4 12-1 could escape from a light congestion state or a heavy congestion state, light congestion detecting unit 121a or heavy congestion detecting unit 121b notifies congestion control server 101 to that effect. Congestion control server 101 receives information concerning escape from the congestion state, registers to that effect in congestion state information 101a4 using traffic managing unit 101a, and transmits a congestion control message for instructing an adjacent node (in the case of FIG. 5, relay node CL4 12-2) connected to relay node CL4 12-1 to release the bypass operation for the control message to relay node CL4 12-1. As a result, the adjacent node is restored to a normal state for registering, when a control message that is to be transmitted to relay node CL4 12-1 is received, the control message in reception queue 16 of relay node CL4 12-1.

The congestion control operation concerning relay node CL4 12 described above is completely the same when a control message is transmitted from subscriber accommodation node CL5 11 to relay node CL4 12. The congestion control operation concerning relay node CL4 12 may be performed in the same manner as that in the case of subscriber accommodation node CL5 11 described in the first embodiment to regulate an operation itself for transmitting a control message to relay node CL4 12 in which congestion or likelihood of congestion has occurred.

By applying the congestion control method described in this embodiment, not only for subscriber accommodation node CL5 11 but also for relay node CL4 12 that transfers a control message, transfer of the control message through a route bypassing relay node CL4 12, which has fallen into a congestion state, can be easily realized simply by adding a route selecting function to a layer at a higher level (e.g., an SIP protocol) as a communication protocol for realizing a service network on an IP network without changing a transfer control layer of an existing general-purpose IP protocol. It is also possible to normally continue call processing concerning a new outgoing call or an in-speech call.

Third Embodiment

An example of an operation for regulating input of a control message from PSTN network 50 connected to relay node CL4 12 that has fallen into a light congestion state or a heavy congestion state is explained with reference to FIG. 4.

Figure 6A:
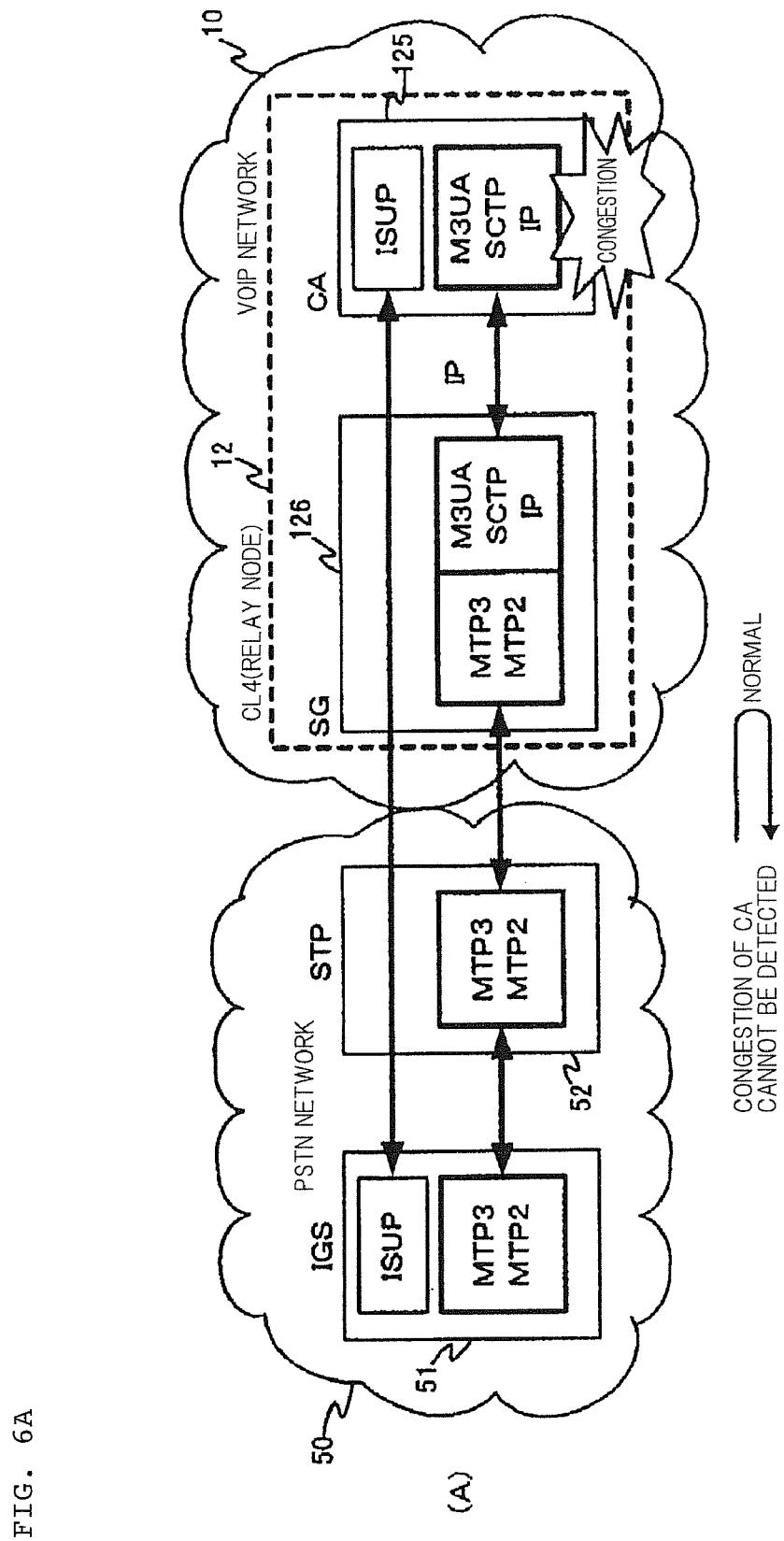
FIGS. 6A and 6B are diagrams for explaining operations in a third embodiment of the congestion control system according to the present invention.
Figure 6B:
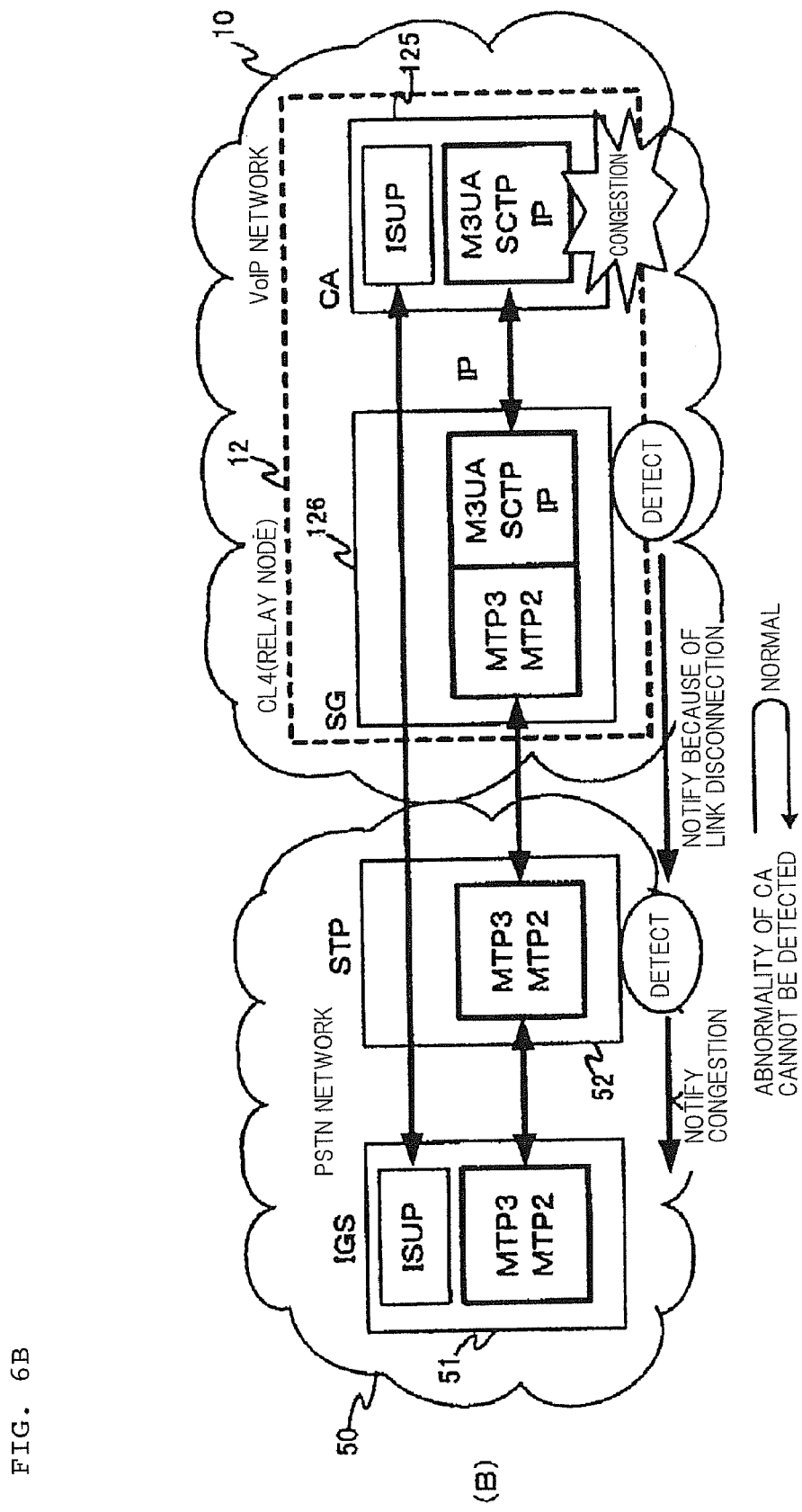

FIGS. 6A and 6B are diagrams for explaining operations in a third embodiment of congestion control system 100 according to the present invention. Specifically, FIGS. 6A and 6B are diagrams for explaining an operation for regulating, when it is detected that relay node CL4 12 to which PSTN network 50 is connected is in a congestion sign state or has fallen into a congestion state, a control message from PSTN network 50 relay node CL4 12 with a case in which an SIP (Session Initiation Protocol) is adopted as a protocol for call control for a VoIP network as an example.

In the VoIP network in the past, usually, when PSTN network 50 and VoIP network 10 are connected, as shown in FIG. 6A, STP (Signal Transfer Point) 52 on PSTN network 50 side and SG (Signaling GW (Gateway)) 126 in relay node CL4 12 on VoIP network 10 side are connected when a control signal of a No7 common channel signaling system is transmitted and received as a control signal for network-to-network connection.

STP 52 is an apparatus that serves as a signal node configuring a signal network for telephone and transfers a control signal conforming to the No7 common channel signaling system. SG 126 has a gateway function of transmitting and receiving a control signal between an external connection port and CA (Call Agent) 125. SG 126 makes it possible to perform transmission and reception with CA 125 by converting MTP2 (Message Transfer Part Level 2) and MTP3 Message Transfer Part Level 3) protocols in a lower-order layer of a control signal from STP 52 into an M3UA SCTP IP protocol for IP. Call control information between STP 52 and SG 126 is exchanged using an ISUP (ISDN User Part) protocol as a protocol in a higher-order layer that treats information for call processing. CA 125 has a function of carrying out call control of a VoIP service. When a call connected to PSTN network 50 is controlled, CA 125 performs connection control for the connected call by exchanging a message for control with IGS 51 through SG 126 and STP 52 of PSTN network 50.

In such an network-to-network connection form in the past, even when relay node CL4 12 has fallen into a light congestion state or a heavy congestion state and execution of call processing by CA 125, which performs call control, is hindered, SG 126 is in a normal state. Therefore, STP 52 on PSTN network 50 side cannot detect the congestion state of CA 125, i.e., the congestion state of relay node CL4 12. STP 52 does not regulate input of a control signal from IGS 51 to relay node CL4 12. Every time the input of a control signal is requested, STP 52 transfers the request to SG 126 of relay node CL4 12. As a result, regardless of the fact that CA 125 of relay node CL4 12 is in a congestion state, a control message from PSTN network 50 side continues to flow in and a congestion situation in CA 125 is aggravated.

The embodiment shown in FIG. 6B indicates an example for solving such a problem in the past. In this embodiment, SG 126 and CA 125 operate in cooperation to make it possible to notify STP 52 of PSTN network 50 of a congestion state of CA 125 through SG 126.

An execution procedure in the explanatory diagram shown in FIG. 6B is as described below. SG 126 of relay node CL4 12 always monitors a state of CA 125. When it is detected that CA 125 has fallen into a congestion state, SG 126 notifies STP 52 of congestion in relay node CL4 12 by, for example, disconnecting a link connected to STP 52 of PSTN network 50. STP 52 detects the disconnection of the link and cannot make connection to relay node CL4 12 of VoIP network 10 on a partner side to which a control signal for network-to-network connection is transmitted from STP 52. Therefore, STP 52 is set in an outgoing connection regulated state for suppressing transmission of a control signal from STP 52 to relay node CL4 12.

As a result, input of a new processing request from PSTN network 50 to relay node CL4 12 of VoIP network 10 is regulated and it is possible to effectively support escape from the congestion state of relay node CL4 12.

When congestion in CA 125 is detected, SG 126 may notify STP 52 of congestion in relay node CL4 12 by disconnecting a link with STP 52 for a fixed time decided in advance. STP 52 detects the disconnection of the link for the fixed time, suppresses only a control signal for performing a new call setting request for network-to-network connection, and continues an operation for transmitting control signals for disconnection and call. Consequently, it is possible to normally process an in-speech call while realizing an input regulated state in which a new incoming call from PSTN network 50 is suppressed.

Alternatively, SG 126 may always detect a processable ability of CA 125 and control, according to a processing ability of CA 125, the number of control signals extracted (unloaded) from a reception queue in which a control signal for processing request from STP 52 of PSTN network 50 is registered. For example, when it is detected that CA 125 has fallen into a heavy congestion state in which call processing can hardly be executed, SG 126 stops an operation of unloading of the control signal from the reception queue. As a result, only the control signal from STP 52 of PSTN network 50 is registered in the reception queue. The number of control signals increases and a queue length of the reception queue is extended.

On the other hand, STP 52 of PSTN network 50 that registers a control signal for network-to-network connection in the reception queue always monitors, in the same manner as a congestion monitoring system for an adjacent node by the MTP3 level of the No7 common channel signaling system, a queue length of the reception queue in which a control signal to SG 126 is registered. When the queue length exceeds a threshold decided in advance, STP 52 judges that relay node CL4 12 on a partner side has fallen in a congestion state and shifts to an outgoing connection regulated state for regulating an operation for registering a control signal for a new processing request in the reception queue. As a result, relay node CL4 12 can perform input regulation control for receiving a control signal for a processing request from PSTN network 50 according to a processing ability of CA 125.

By applying the congestion control method described in this embodiment, it is possible to regulate inflow of traffic exceeding the processing ability of CA 125 of relay node CL4 12 from PSTN network 50. Therefore, it is possible to prevent relay node CL4 12 from falling into a congestion state because of traffic from PSTN network 50 and stably operate VoIP network 10.

Fourth Embodiment

An example, which is different from the third embodiment, for regulating input of a control message from other networks 60 other than a VoIP network such as a PSTN network connected to relay node CL4 12 that has fallen into a light congestion state or a heavy congestion state is explained with reference to FIG. 7.

Figure 7:
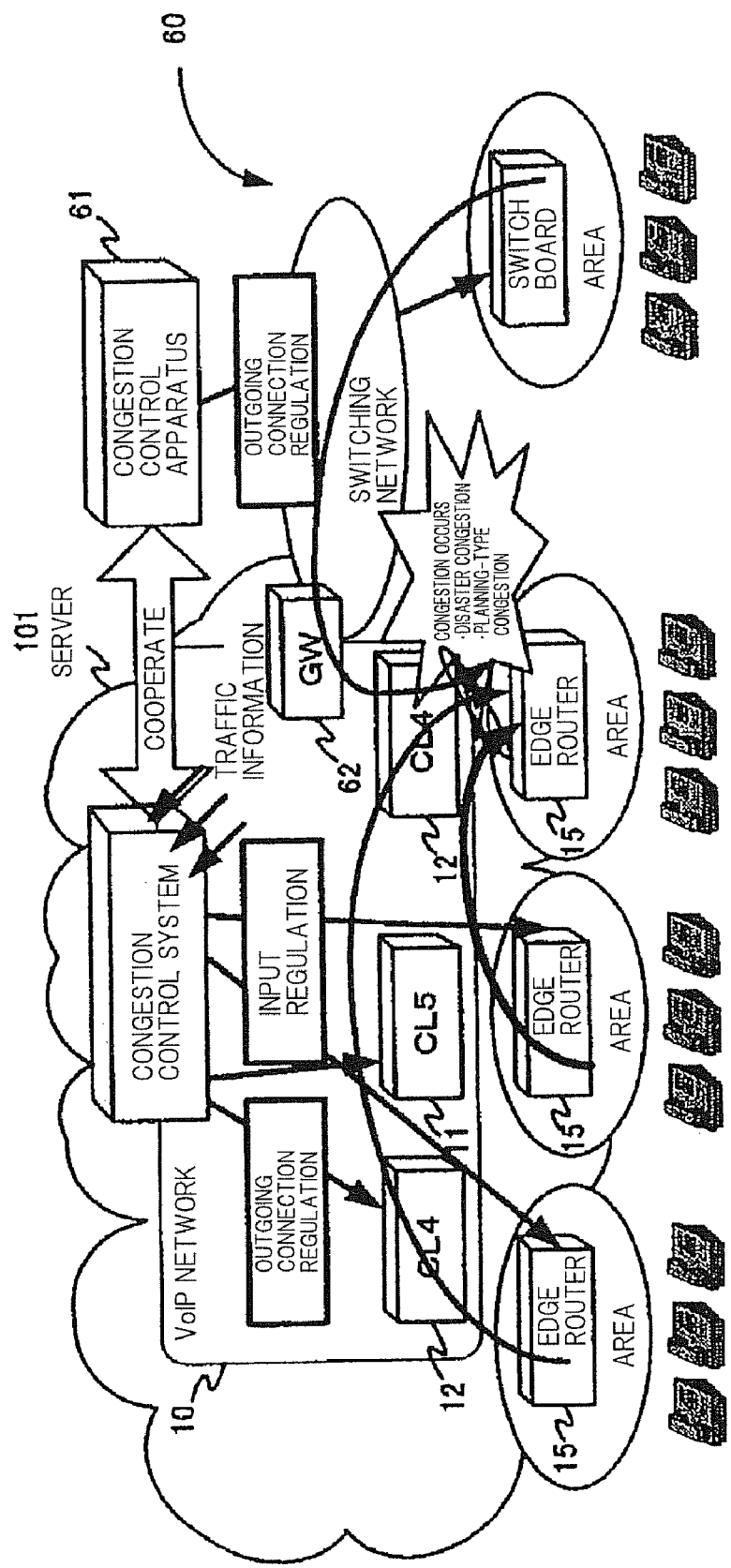
FIG. 7 is a diagram for explaining operations in a fourth embodiment of the congestion control system according to the present invention.

FIG. 7 is a diagram for explaining operations in a fourth embodiment of congestion control system 100 according to the present invention. Specifically, FIG. 7 is a diagram for explaining an example for realizing an end-to-end flow control operation by allowing congestion control server 101 of VoIP network 10 to import and export information concerning congestion control (traffic information, regulation information for outgoing connection and incoming connection, etc.) in cooperation with congestion control apparatus 61 set in other networks 60.

In the VoIP network in the past, congestion control server 101 does not exchange traffic information and congestion information with other networks 60. As described above, other networks 60 not conforming to an IP protocol such as PSTN network 50 do not include means for grasping congestion situations of respective nodes configuring the VoIP network (e.g., subscriber accommodation nodes CL5 11 and relay nodes CL4 12 in VoIP network 10). Therefore, burst-like inflow of a large amount of traffic from other networks 60 to VoIP network 10 may occur. Even in such a case, only congestion control in VoIP network 10 can be performed and outgoing connection regulation in other networks 60 cannot be carried out. Therefore, appropriate regulation control cannot be realized.

The embodiment shown in FIG. 7 indicates an example for solving such a problem in the past. Congestion control apparatus 61 having functions (e.g., a function of collecting traffic information of respective nodes by route and by area and outputting a congestion control message for regulating outgoing connection and incoming connection to the respective message by route and by area) same as those of congestion control server 101 of VoIP network 10 is arranged in other networks 60. Congestion control server 101 of VoIP network 10 and congestion control apparatus 61 of other networks 60 operate in cooperation to thereby make it possible to realize appropriate congestion control during network-to-network connection.

As shown in FIG. 7, in the congestion control system, congestion control server 101 of VoIP network 10 and congestion control apparatus 61 of other networks 60 are connected to each other to be capable of cooperating with each other. Therefore, it is possible to import and export information concerning congestion control (traffic information, regulation information for outgoing connection and incoming connection, or regulation information such as a regulation amount indicating which degree of regulation is executed on which subscriber accommodation node) between congestion control server 101 and congestion control apparatus 61.

Consequently, when network-to-network connection to other networks 60 is performed through gateway (MG: Media GW) 62, information concerning congestion control set by congestion control apparatus 61 of other networks 60 is imported to congestion control server 101 of VoIP network 10. This makes it possible to regulate an operation in which control messages from VoIP network 10 is excessively transmitted to a specific user terminal, a specific relay node, and the like in a congestion state in other networks 60. By exporting information concerning congestion control set by congestion control server 101 of VoIP network 10 to congestion control apparatus 61 of other networks 60, it is possible to regulate an operation in which control messages from other networks 60 excessively flow into a specific user terminal, edge router 15, specific subscriber accommodation node CL5 11, and specific relay node CL4 12 in a congestion state in VoIP network 10.

By applying the congestion control method capable of performing end-to-end flow control described in this embodiment, it is possible to regulate inflow of traffic exceeding processing abilities of subscriber accommodation node CL5 11, relay node CL4 12, edge router 15, and a user terminal from other networks 60 side. Therefore, even when it is likely that, for example, congestion due to a disaster or congestion due to planning of an event such as a concert occurs, it is possible to prevent subscriber accommodation node CL5 11, relay node CL4 12, edge router 15, and the user terminal from falling into a congestion state because of traffic from other networks 60 side. It is possible to stably operate VoIP network 10.

Fifth Embodiment

An example of an incoming call regulating (input regulating) operation for regulating a control message to subscriber accommodation node CL5 11 in a specific area that has fallen into a light congestion state or a heavy congestion state or is predicted to be likely to fall into a congestion state is explained with reference to FIG. 8.

Figure 8:
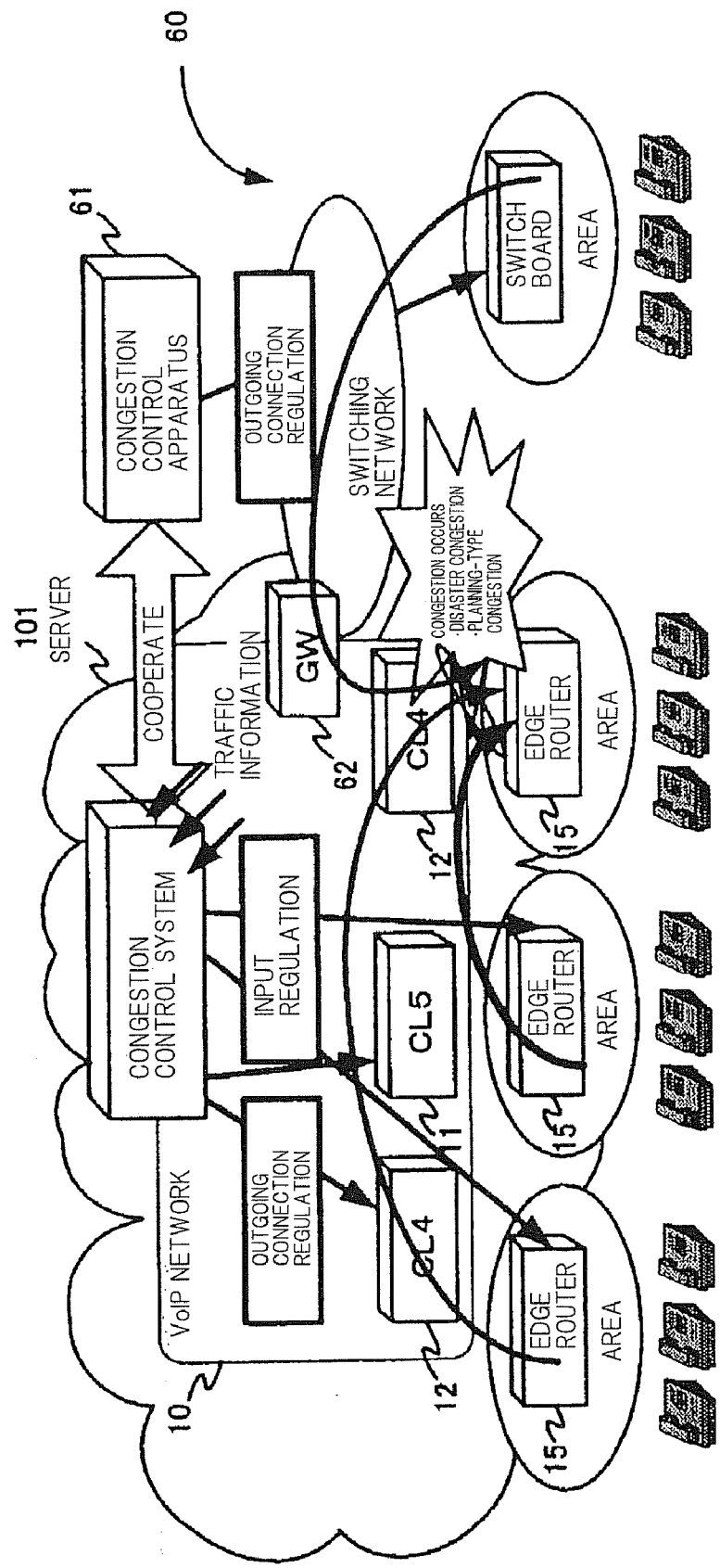
FIG. 8 is a diagram for explaining operations in a fifth embodiment of the congestion control system according to the present invention.

FIG. 8 is a diagram for explaining operations in a fifth embodiment of congestion control system 100 according to the present invention. Specifically, FIG. 8 is a diagram showing an example of an operation for regulating, when specific subscriber accommodation node CL5 11 has fallen into a congestion state or is likely to fall into congestion, inflow of a control message into subscriber accommodation node CL5 11 by autonomously transmitting a congestion control message for regulating transmission of a control message, which is transmitted to subscriber accommodation node CL5 11, according to traffic information and contract traffic information in the past from congestion control server 101 to respective nodes in VoIP network 10 and other networks.

As described above, in the VoIP network in the past, when control messages to a user terminal of a specific subscriber from plural areas are concentratedly generated at a time, for example, subscriber accommodation node CL5 11-4 that stores the user terminal of the subscriber congests. When subscriber accommodation node CL5 11-4 configuring VoIP network 10 congests, congestion propagates to adjacent relay node CL4 12-1 and relay node CL4 12-2 connected to subscriber accommodation node CL5 11-4. Congestion also propagates to other subscriber accommodation nodes CL5 11 connected to relay node CL4 12-1 and relay node CL4 12-2. As a result, operations of entire VoIP network 10 become unstable.

In some case, outgoing connection regulation for regulating an operation for transmitting a control message to subscriber accommodation node CL5 11-4 in a specific area in which congestion has occurred is carried out. In such a case, in the outgoing connection regulation by a maintenance command in the past and the congestion control technique described in Patent Document 1, control for uniformly regulating the number of control messages transmitted to specific subscriber accommodation node CL5 11-4 is performed in each of subscriber accommodation nodes CL5 11 (11-1, 11-2, 11-3, etc.) arranged in respective areas of VoIP network 10.

For example, as shown in FIG. 8, VoIP network 10 includes four subscriber accommodation nodes CL5 11 (11-1, 11-2, 11-3, and 11-4). In subscriber accommodation nodes CL5 11-1, 11-2, and 11-3, as an average amount of traffic to subscriber accommodation node CL5 11-4 in the past in a specific area (an area D), a traffic amount (the number of calls) per a unit time is 10,000 calls, 1,000 calls, and 400 calls, respectively. Congestion has occurred in subscriber accommodation node CL5 11-4 in the specific area (the area D). This situation is considered. In this situation, when an amount of inflow traffic (the number of allowed calls) from other nodes that can be treated in subscriber accommodation node CL5 11-4 is limited to 600 calls, the 600 calls of the allowed amount are controlled to be equally distributed to other three subscriber accommodation nodes CL5 11-1, 11-2, and 11-3.

In other subscriber accommodation nodes CL5 11-1, 11-2, and 11-3 arranged in respective areas (areas A, B, and C), the number of control messages transmitted per a unit time (a regulation amount) to subscriber accommodation node CL5 11-4 is controlled to be uniformly regulated to (600/3)=200 calls. As a result, ratios to average traffic amounts in the past, i.e., regulation ratios are $\{(10,000-200)/10,000\}=98\%$, $\{(1,000-200)/1,000\}=80\%$, and $\{(400-200)/400\}=50\%$ in subscriber accommodation nodes CL5 11-1, 11-2, and 11-3, respectively. This results in a lack of fairness.

The embodiment shown in FIG. 8 indicates an example for solving such a problem in the past. In this embodiment, congestion control server 101 periodically collects and manages traffic information of respective nodes (subscriber accommodation nodes CL5 11 and relay nodes CL4 12) in VoIP network 10 by route and by area. Congestion control server 101 controls, when subscriber accommodation node CL5 11 in a specific area has fallen into a congestion state or occurrence of congestion is predicted in the specific area, an amount of traffic (the number of calls) to subscriber accommodation node CL5 11 on the basis of information concerning traffic (information concerning the number of calls, etc.) to subscriber accommodation node CL5 11 in the area collected in the past. Consequently, fairness concerning incoming call regulation for an amount of inflow of control messages from the respective areas is realized.

In order to regulate concentration of incoming calls to specific subscriber accommodation node CL5 11 in which congestion has occurred or occurrence of congestion is predicted, when outgoing connection regulation for respective subscriber accommodation nodes CL5 11 in VoIP network 10 is performed, regulation amounts are weighted according to information concerning traffic (information concerning the number of calls, etc.) in the past to specific subscriber accommodation node CL5 11 among subscriber accommodation nodes CL5 11. Consequently, even when information concerning traffic (information concerning the number of calls, etc.) in the past to specific subscriber accommodation node CL5 11 fluctuates among respective subscriber accommodation nodes CL5 11, it is possible to uniformalize regulation ratios for carrying out outgoing connection regulation in respective subscriber accommodation nodes CL5 11 and realize fairness.

As described above, congestion control server 101 manages information concerning respective nodes (subscriber accommodation nodes CL5 11 and relay nodes CL4 12) configuring VoIP network 10 by area and by route and grasps topology information, session routing information, traffic information, and the like in areas and among areas and among routes.

In FIG. 8, the number of control messages for incoming calls exceeding a threshold decided in advance is detected per a unit time and congestion occurs in subscriber accommodation node CL5 11-4 in a specific area D. It is possible to carry out completely the same congestion control method not only during occurrence of congestion but also when occurrence of congestion is predicted. When congestion control server 101 receives notification indicating occurrence of congestion (or prediction of occurrence of congestion) from subscriber accommodation node CL5 11-4, congestion control server 101 calculates, with reference to information concerning traffic (information concerning the number of calls) from respective nodes (subscriber accommodation nodes CL5 11 and relay nodes CL4 12) and other networks to subscriber accommodation node CL5 11-4 in the area D collected in the past, regulation amounts weighted by the traffic information in the past, respectively.

As described above, VoIP network 10 includes four subscriber accommodation nodes CL5 11 (11-1, 11-2, 11-3, and 11-4). In subscriber accommodation nodes CL5 11-1, 11-2, and 11-3, as an average amount of traffic to subscriber accommodation node CL5 11-4 in the past in a specific area (an area D), traffic amounts (the numbers of calls) per a unit time are 10,000 calls, 1,000 calls, and 400 calls, respectively. Congestion has occurred in subscriber accommodation node CL5 11-4 in the specific area (the area D). This situation is considered. In this situation, when an amount of inflow traffic (the number of allowed calls) from other nodes that can be treated in subscriber accommodation node CL5 11-4 is limited to 600 calls, regulation ratios of subscriber accommodation nodes CL5 11-1, 11-2, and 11-3 are controlled to be identical.

When a sum of 10,000 calls, 1,000 calls, and 400 calls as an average amount of traffic in the past to subscriber accommodation node CL5 11-4 is regulated to 600 calls, for respective subscriber accommodation nodes CL5 11-1, 11-2, and 11-3, a regulating ratio is controlled to be [{(10,000+1,000+400)−600}/(10,000+1,000+400)]=94.74%.

Consequently, as shown in FIG. 8, the numbers of transmitted calls of control messages per a unit time to subscriber accommodation node CL5 11-4 after the regulation for respective subscriber accommodation nodes CL5 11-1, 11-2, and 11-3 are regulated as described below.

10,000×(1−0.9474)=526 calls 1,000×(1−0.9474)=53 calls

400×(1−0.9474)=21 calls

Such a congestion control message for regulating the numbers of transmitted calls as described above is generated by congestion control server 101 and transmitted to respective subscriber accommodation nodes CL5 11-1, 11-2, and 11-3.

By transmitting the congestion control message for regulating the numbers of calls to the numbers of calls (regulation amounts) weighted on the basis of the traffic information in the past as described above, it is possible to secure fairness of regulation amounts and utilize a transfer ability of VoIP network 10 in a state corresponding to a traffic communication state in the past of the respective subscriber accommodation nodes.

The regulation amounts may be weighted using, instead of using the traffic information in the past, contract traffic information for each of areas or each of partner subscribers and using required traffic amounts (required numbers of calls) that subscriber accommodation nodes CL5 11 (11-1, 11-2, 11-3, etc.) arranged in the respective areas secure. Alternatively, the regulation amounts may be weighted using both the traffic information in the past and the required traffic amounts (the required numbers of calls) in a contract.

By carrying out such congestion control, when congestion is eliminated or likelihood of congestion is eliminated in subscriber accommodation node CL5 11-4 in the specific area in which congestion has occurred or occurrence of congestion is predicted and subscriber accommodation node CL5 11-4 is restored to its original state, congestion control server 101 is notified to that effect. Congestion control server 101 receives the notification and transmits a congestion control message for instructing subscriber accommodation nodes CL5 11 (11-1, 11-2, 11-3, etc.) in the respective areas regulated for congestion control to release the regulation. As a result, VoIP network 10 is restored to a state in which the transfer ability is sufficiently utilized.

By applying the congestion control method described in this embodiment, in subscriber accommodation nodes CL5 11 (11-1, 11-2, 11-3, etc.) in the respective areas, it is possible to uniformalize probabilities (regulation ratios) of control messages transmitted to specific subscriber accommodation node CL5 11-4, in which congestion has occurred or congestion is likely to occur, being regulated and it is possible to carry out fair traffic control for the respective subscribers. Further, when congestion occurs, by carrying out regulation in respective subscriber accommodation nodes CL5 11 (11-1, 11-2, 11-3, etc.) in the respective areas as entrances to VoIP network 10, it is possible to realize a stable operation of VoIP network 10.

Moreover, subscriber accommodation nodes CL5 11 (11-1, 11-2, 11-3, etc.) are divided in plural areas and are arranged in association with the respective areas. Congestion control server 101 owns topology in formation among subscriber accommodation nodes CL5 11 (11-1, 11-2, 11-3, etc.) arranged in association with the respective areas. Consequently, when VoIP network 10 is increased in size, it is possible to narrow down subscriber accommodation nodes CL5 11 as regulation objects of congestion control server 101 and it is possible to reduce a load on congestion control system 100.

Sixth Embodiment

An example, which is different from the fifth embodiment, of incoming call regulation (input regulation) for regulating a control message to subscriber accommodation node CL5 11 in a specific area that has fallen into a light congestion state or a heavy congestion state or is predicted to be likely to fall into a congestion state is explained with reference to FIGS. 9A and 9B.

Figure 9B:
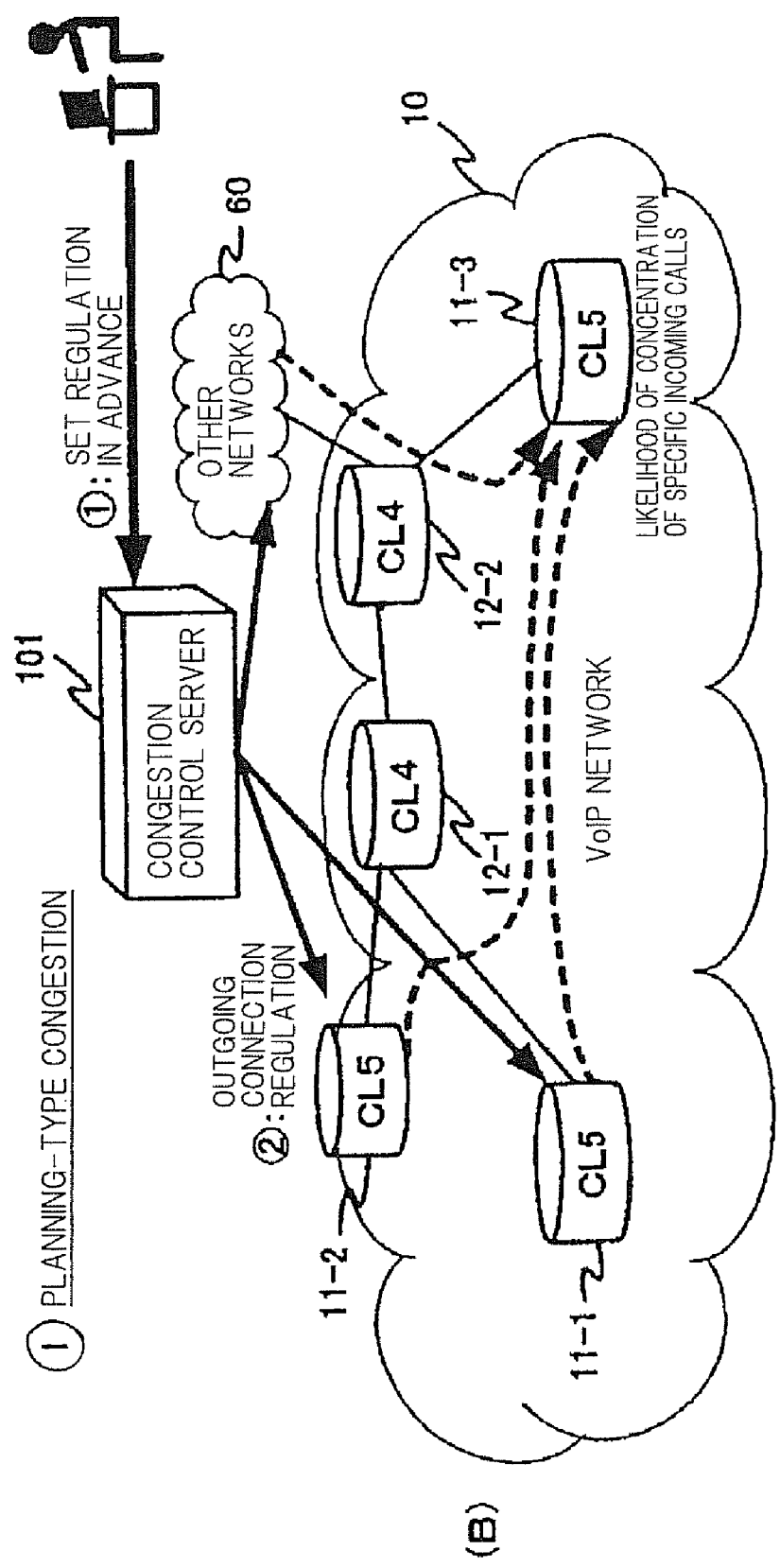

FIGS. 9A and 9B are diagrams for explaining operations in a sixth embodiment of congestion control system 100 according to the present invention. Specifically, FIGS. 9A and 9B are diagrams showing an example of an operation for regulating, when specific subscriber accommodation node CL5 11 has fallen into a congestion state or is likely to fall into congestion, inflow of a control message into subscriber accommodation node CL5 11 by autonomously transmitting a congestion control message for regulating transmission of a control message, which is transmitted to subscriber accommodation node CL5 11, from congestion control server 101 to respective nodes in VoIP network 10 and other networks.

When an event such as sales of tickets for a concert or a firework display is planned in a specific period planned in advance, it is predicted in advance that it is likely that subscriber accommodation node CL5 11, in which a user terminal of a subscriber as a ticket sales source is accommodated, falls into a congestion state in the specific period. In preparation for such a case, a maintenance person for congestion control server 101 designates a specific period and inputs a maintenance command for regulating transmission of a control message to subscriber accommodation node CL5 11 in the designated period. Consequently, congestion control server 101 transmits a congestion control message for regulating transmission of a control message to subscriber accommodation node CL5 11 to respective nodes in VoIP network 10 and other networks only in the designated period. An example of this operation is described below.

As shown in FIG. 9A, in some case, since a disaster occurs in a specific area, calls of inquiry from respective areas to subscriber accommodation node CL5 11-3 in the area are concentratedly generated and subscriber accommodation node CL5 11-3 has fallen into a congestion state. As shown in FIG. 9B, in some case, when an event such as a concert is planned and sales of tickets is started, calls for ticket purchase from respective areas to subscriber accommodation node CL5 11-3, in which a user terminal of a ticket sales source is accommodated, are concentratedly generated and subscriber accommodation node CL5 11-3 is likely to fall into congestion. In such a case, in the past, the maintenance person for subscriber accommodation node CL5 11-3 inputs a command for input regulation to thereby regulate inflow of a control message for processing request inputted from the respective areas to subscriber accommodation node CL5 11-3.

However, only input regulation to subscriber accommodation node CL5 11-3 is performed and transmission regulation for regulating transmission of a control message from subscriber accommodation nodes CL5 11 (11-1, 11-2, etc.) in the respective areas to subscriber accommodation node CL5 11-3 cannot be performed. Therefore, a state in which control messages rush to subscriber accommodation node CL5 11-3 continues. It takes long for subscriber accommodation node CL5 11-3 to recover from a congestion state. Moreover, invalid control messages to subscriber accommodation node CL5 11-3 pile up in VoIP network 10. Therefore, it is likely that congestion expands into VoIP network 10.

When likelihood of occurrence of congestion in subscriber accommodation node CL5 11 in a specific area is predicted in advance because of an event such as a concert or a firework display held in a specific period planned in advance, the maintenance person has to manually input a maintenance command for preventing congestion to subscriber accommodation node CL5 11. When the maintenance command manually inputted is used, there is a worry about omission of input of the maintenance command and occurrence of an error. After the end of the event, the maintenance person needs to manually input a maintenance command for releasing the regulation for preventing congestion to subscriber accommodation node CL5 11. In such a case, there is also a worry about omission of input of the maintenance command and occurrence of an error.

The embodiment shown in FIGS. 9A and 9B indicates an example for solving such a problem in the past. In this embodiment, as shown in FIG. 9A, when congestion due to a disaster occurs in subscriber accommodation node CL5 11-3 in a specific area because of occurrence of a disaster in the area, subscriber accommodation node CL5 11-3 that detects the occurrence of congestion notifies congestion control server 101 of the occurrence of congestion. Consequently, congestion control server 101 creates a congestion control message for instruction for regulating transmission of a control message to subscriber accommodation node CL5 11-3 (performing outgoing connection regulation) and transmits the congestion control message to other subscriber accommodation nodes CL5 11 (11-1, 11-2, etc.) and relay node CL4 12 (12-1, 12-2, etc.) constituting VoIP network 10 or other networks 60.

Consequently, an operation for transmitting control messages from other subscriber accommodation nodes CL5 11 (11-1, 11-2, etc.), relay nodes CL4 12 (12-1, 12-2, etc.), and other networks 60 to subscriber accommodation node CL5 11-3 is regulated (outgoing connection is regulated). Therefore, subscriber accommodation node CL5 11-3 can escape from a congestion state early. Moreover, invalid control messages to subscriber accommodation node CL5 11-3 do not pile up in VoIP network 10. Therefore, it is possible to prevent congestion from expanding into VoIP network 10.

When it is likely that planning-type congestion is likely to occur as shown in FIG. 9B, at a stage when a specific period in which occurrence of congestion is likely such as a ticket sales period is planned, the maintenance person for congestion control server 101 designates the specific period corresponding to the ticket sales period or the like. The maintenance person inputs in advance a period-designated regulation command for instructing regulation for transmission of a control message to subscriber accommodation node CL5 11-3 in a specific area in which a user terminal as a ticket sales source or the like is accommodated (performing outgoing connection regulation) in the specific period. Congestion control server 101 has a function of capable of registering in advance regulation information for regulating an amount of traffic of incoming calls (the number of calls) of control messages to a specific subscriber in the designated period.

Congestion control server 101 receives the period-designated regulation command. When a regulated start date and time designated in the period comes, congestion control server 101 creates a congestion control message for instructing regulation of transmission of a control message to subscriber accommodation node CL5 11-3 and transmits the congestion control message to other subscriber accommodation nodes CL5 11 (11-1, 11-2, etc.) and relay nodes CL4 12 (12-1, 12-2, etc.) configuring VoIP network 10 or other networks 60. When a regulation end date and time designated in the period comes, congestion control server 101 creates a congestion control message for instructing release of the regulation for transmission of a control message to subscriber accommodation node CL5 11-3 and transmits the congestion control message to other subscriber accommodation nodes CL5 11 (11-1, 11-2, etc.) and relay nodes CL4 12 (12-1, 12-2, etc.) configuring VoIP network 10 or other networks 60.

In other words, when a large number of control messages to a specific subscriber are generated and congestion control server 101 grasps in advance a period in which congestion in subscriber accommodation node CL5 11-3, in which a user terminal of the specific subscriber is accommodated, is predicted, in congestion control server 101, the maintenance person registers in advance regulation information for regulating, with a period designated, a control message to subscriber accommodation node CL5 11-3. Examples of the regulation information to be registered include a regulation start date and time, a regulation end date and time, a user terminal number of a subscriber as a regulation object, and the number of calls of control messages allowed per a unit time.

When the registered regulation start date and time comes, congestion control server 101 transmits a congestion control message for regulating transmission of a control message to subscriber accommodation node CL5 11-3 using a regulation amount calculated on the basis of an average amount of traffic in the past from subscriber accommodation nodes CL5 11 (11-1, 11-2, etc.) in the respective areas to subscriber accommodation node CL5 11-3 and a contract traffic amount (information concerning the number of calls). On the other hand, when the registered regulation end date and time comes, congestion control server 101 transmits a congestion control message for releasing the regulation of transmission of a control message from subscriber accommodation nodes CL5 11 (11-1, 11-2, etc.) in the respective areas to subscriber accommodation node CL5 11-3. As a result, it is possible to prevent a situation in which subscriber accommodation node CL5 11-3, in which the user terminal of the specific subscriber is accommodated, falls into a congestion state.

In the above explanation, when a period-designated regulation command is inputted, congestion control server 101 judges whether a designated regulation start date and time or regulation end date and time comes. When the regulation start time comes, congestion control server 101 creates and transmits a congestion control message for performing regulation. When the regulation end time comes, congestion control server 101 creates and transmits a congestion control message for performing release of the regulation. However, it is also possible that, at a point when the period-designated regulation command is received, congestion control server 101 generates a congestion control message with period designation including a designated period and transmits the congestion control message to the respective nodes (subscriber accommodation nodes CL5 11 and relay nodes CL4 12) of VoIP network 10 or other networks and the respective nodes or the other networks receive the congestion control message with period designation and judge whether the designated regulation start date and time or regulation end date and time comes.

According to the period-designated congestion control described above, an operation for transmitting control messages from other subscriber accommodation nodes CL5 11 (11-1, 11-2, etc.) and relay nodes CL4 12 (12-1, 12-2, etc.) or other networks 60 to subscriber accommodation node CL5 11-3 is regulated (outgoing connection is regulated) in a designated period. Therefore, it is possible to prevent subscriber accommodation node CL5 11-3 from falling into a congestion state. Moreover, invalid control messages to subscriber accommodation node CL5 11-3 do not pile up in VoIP network 10. Therefore, it is possible to prevent congestion from occurring in VoIP network 10.

By applying the congestion control method described in this embodiment, it is possible to regulate, in a place near the entrance to VoIP network 10, traffic to subscriber accommodation node CL5 11 in a specific area in which congestion has occurred or it is likely that congestion occurs. Therefore, it is possible to quicken recovery from a congestion state of subscriber accommodation node CL5 11 in the specific area and it is possible to prevent congestion from expanding into VoIP network 10. Moreover, when it is likely that congestion occurs, it is possible to suppress occurrence of congestion in advance and stably operate VoIP network 10.

According to the period-designated congestion control, by automatically carrying out in advance, before congestion in specific subscriber accommodation node CL5 11 occurs, regulation of transmission from the respective nodes (subscriber accommodation nodes CL5 11 and relay nodes CL4 12) in VoIP network 10 to specific subscriber accommodation node CL5 11 (outgoing connection regulation), it is possible to prevent specific subscriber accommodation node CL5 11 and VoIP network 10 from falling into a congestion state. Moreover, by automatically carrying out regulation and releasing the regulation according to a designated regulation start date and time and regulation end date and time, it is possible to prevent omission of input of a regulation command, input of a wrong command, omission of release of regulation, and the like by the maintenance person.

Seventh Embodiment

An example of an operation for preventing congestion in relay node CL4 12 that has fallen into a light congestion state or a heavy congestion state or is predicted to be likely to fall into a congestion state is explained with reference to FIG. 8 described above.

As described above, in VoIP network in the past, when control messages through identical relay node CL4 12 are concentratedly generated from plural areas, relay node CL4 12 congests. When relay node CL4 12 configuring VoIP network 10 congests, congestion propagates to adjacent relay node CL4 12 and subscriber accommodation node CL5 11 connected to relay node CL4 12. As a result, operations of entire VoIP network 10 become unstable.

This embodiment indicates an example for solving such a problem in the past. In this embodiment, congestion control server 101 and respective nodes (relay nodes CL4 12 and subscriber accommodation nodes CL5 11) of VoIP network 10 operate in cooperation with each other. When a congestion state occurs in specific relay node CL4 12, congestion control server 101 receives notification of the occurrence of the congestion state and transmits a congestion control message for regulating an operation for transmitting a control message through specific relay node CL4 12, which has fallen into the congestion state, to the respective nodes (relay nodes CL4 12 and subscriber accommodation nodes CL5 11).

As described above, congestion control server 101 manages information concerning the respective nodes (subscriber accommodation nodes CL5 11 and relay nodes CL4 12) configuring VoIP network 10 by area and by route and grasps topology information, session routing information, traffic information, and the like in areas and among areas and among routes. Congestion control server 101 dividedly manages subscriber accommodation nodes CL5 11, in which subscribers are accommodated, for each of the areas and owns topology information among subscriber accommodation nodes CL5 11 in the respective areas. This makes it possible to narrow down subscriber accommodation nodes CL5 11 that regulate an operation in which control messages among subscriber accommodation nodes CL5 11 in the respective areas are transmitted through specific relay node CL4 12.

Congestion control server 101 periodically collects and manages traffic information of respective nodes (subscriber accommodation nodes CL5 11 and relay nodes CL4 12) in VoIP network 10 by route and by area. Congestion control server 101 controls, when specific relay node CL4 12 has fallen into a congestion state or occurrence of congestion is predicted therein, an amount of traffic (the number of calls) among subscriber accommodation nodes CL5 11 in the respective areas through relay node CL4 12 on the basis of information concerning traffic (information concerning the number of calls, etc.) in the past among subscriber accommodation nodes CL5 11 in the respective areas through relay node CL4 12. Consequently, fairness concerning regulation amounts of regulation of control messages among subscriber accommodation nodes CL5 11 in the respective areas is realized. It is possible to limit a congestion control object range in VoIP network 10.

Moreover, when the number of control messages for relay exceeding a threshold decided in advance is detected per a unit time and congestion occurs or when occurrence of congestion is predicted in specific relay node CL4 12-1 shown in FIG. 8, notification indicating the occurrence of the congestion (or the prediction of occurrence of congestion) is transmitted from specific relay node CL4 12-1 to congestion control server 101. Congestion control server 101 receives the notification indicating the occurrence of the congestion (or the prediction of occurrence of congestion). Congestion control server 101 calculates regulation amounts weighted by traffic information in the past, respectively, with reference to information concerning traffic (information concerning the number of calls) among the nodes (subscriber accommodation nodes CL5 11 and relay nodes CL4 12) in the respective areas and between the nodes and other networks through relay node CL4 12-1 collected in the past.

As indicated by the example in FIG. 8, there is only traffic from three subscriber accommodation nodes CL5 11 (11-1, 11-2, and 11-3) to subscriber accommodation node CL5 11-4 as traffic in the past through relay node CL4 12-1, in which congestion has occurred or likelihood of congestion is predicted. Average amounts of traffic (the numbers of calls) per a unit time in the past from subscriber accommodation nodes CL5 11-1, 11-2, and 11-3 to subscriber accommodation node CL5 11-4 are 10,000 calls, 1,000 calls, and 400 calls, respectively. This situation is considered. In this situation, when an amount of relay traffic (the number of allowed calls) that can be treated in relay node CL4 12-1 is limited to 600 calls, as in the case of the fifth embodiment, regulation ratios of traffic from subscriber accommodation nodes CL5 11-1, 11-2, and 11-3 through relay node CL4 12-1 are controlled to be identical as described below.

When 10,000 calls, 1,000 calls, and 400 calls, which are average amounts of traffic in the past from respective subscriber accommodation nodes CL5 11-1, 11-2, and 11-3 to subscriber accommodation node CL5 11-4, are average amounts of traffic in the past through relay node CL4 12-1 and a sum of the average amounts of traffic is regulated to 600 calls, for respective subscriber accommodation nodes CL5 11-1, 11-2, and 11-3, a regulating ratio is controlled to be [{(10,000+1,000+400)−600}/(10,000+1,000+400)]= 94.74%.

Consequently, the numbers of transmitted calls of control messages per a unit time to subscriber accommodation node CL5 11-4 from respective subscriber accommodation nodes CL5 11-1, 11-2, and 11-3 through relay node CL4 12-1 after regulation are regulated as described below.

10,000×(1−0.9474)=526 calls 1,000×(1−0.9474)=53 calls

400×(1−0.9474)=21 calls

Such a congestion control message for regulating the numbers of transmitted calls as described above is generated by congestion control server 101 and transmitted to respective subscriber accommodation nodes CL5 11-1, 11-2, and 11-3.

By transmitting the congestion control message for regulating the numbers of calls to the numbers of calls (regulation amounts) weighted on the basis of the traffic information in the past as described above, it is possible to secure fairness of regulation amounts affecting subscriber accommodation nodes CL5 11 in the respective areas by regulating a relay node and utilize a transfer ability of VoIP network 10 in a state corresponding to a traffic communication state in the past.

The regulation amounts of traffic through relay node CL4 12-1 may be weighted using, instead of using the traffic information in the past, as in the case of the fifth embodiment, contract traffic information for each of areas or each of partner subscribers and using required traffic amounts (required numbers of calls) that subscriber accommodation nodes CL5 11 (11-1, 11-2, 11-3, etc.) arranged in the respective areas secure. Alternatively, the regulation amounts may be weighted using both the traffic information in the past and the required traffic amounts (the required numbers of calls) in a contract.

In some case, VoIP-C plane 10 is formed by topology in which subscriber accommodation nodes CL5 11 (11-1, 11-2, 11-3, etc.) in the respective areas are connected to subscriber accommodation nodes CL5 11 in other areas through plural relay nodes CL4 12 (12-1, 12-2, etc.). In such a case, when occurrence of congestion or likelihood of occurrence of congestion is detected in specific relay node CL4 12-1, congestion control server 101 may generate a congestion control message for controlling to switch a transfer route through specific relay node CL4 12-1 and bypassing the transfer route to other relay nodes CL4 12 (12-2, etc.) and transmit the congestion control message to subscriber accommodation nodes CL5 11 (11-1, 11-2, 11-3, etc.).

By carrying out such congestion control, when congestion is eliminated or likelihood of congestion is eliminated in specific relay node CL4 12-1 in which congestion has occurred or occurrence of congestion is predicted and relay node CL4 12-1 is restored to its original state, congestion control server 101 is notified to that effect. Congestion control server 101 receives the notification and transmits a congestion control message for instructing to subscriber accommodation nodes CL5 11 (11-1, 11-2, 11-3, etc.) in the respective areas regulated for congestion control to release the regulation. As a result, VoIP network 10 is restored to a state in which the transfer ability is sufficiently utilized.

By applying the congestion control method described in this embodiment, regulation amounts of traffic of subscriber accommodation nodes CL5 11 in the respective areas are determined on the basis of a history of transfer messages in the past through relay nodes CL4 12 and a contract traffic amount. Therefore, in congestion control for relay node CL4 12, as in the case of the fifth embodiment, it is possible to uniformalize regulation ratios of control messages for respective subscriber accommodation nodes CL5 11 in the respective areas being regulated and carry out fair traffic control for the respective subscribers. When congestion occurs in relay node CL4 12, by carrying out regulation in respective subscriber accommodation nodes CL5 11 (11-1, 11-2, 11-3, etc.) in the respective areas as entrances to VoIP network 10, it is possible to realize a stable operation of VoIP network 10.

Moreover, in the congestion control for relay node CL4 12, as in the case of the fifth embodiment, subscriber accommodation nodes CL5 11 (11-1, 11-2, 11-3, etc.) are divided in plural areas and are arranged in association with the respective areas. Congestion control server 101 owns topology information among subscriber accommodation nodes CL5 11 (11-1, 11-2, 11-3, etc.) arranged in association with the respective areas. Consequently, when VoIP network 10 is increased in size, it is possible to narrow down subscriber accommodation nodes CL5 11 as regulation objects of congestion control server 101 and it is possible to reduce a load on congestion control system 100.

Eighth Embodiment

As an example for quickening generation of a congestion control message in congestion control server 101, an exemplary embodiment for templating congestion control information indicating a regulation amount and a regulation destination is explained.

As described above, the congestion control method in the past is a method with which a maintenance person individually input maintenance commands for controlling congestion to the respective nodes of VoIP network 10. Therefore, for example, even in a case in which congestion control has to be immediately carried out, it is difficult to quickly carry out the congestion control.

This embodiment indicates an example for solving such a problem in the past. In this embodiment, for respective events as causes of congestion, congestion control information such as types of congestion control messages that are to be transmitted, regulation amounts necessary for performing congestion regulation, and destinations, i.e., regulation destinations of respective subscriber accommodation nodes CL5 11, relay nodes CL4 12, and edge routers 15 are templated and registered in advance to make it possible to quickly generate and transmit a congestion control message. For example, as congestion control information in the case in which an earthquake disaster occurs in the Kanto district, nodes as regulation destinations indicating transmission destinations of a congestion control message at the time when such a disaster occurs and regulation amounts of the respective nodes are registered in congestion control server 101 as a template in advance with a template name such as "Kanto/earthquake" attached thereto. Thereafter, when a highly urgent event such as an earthquake disaster occurs in the Kanto district, templates are searched through on the basis of the event, a congestion control message is immediately generated on the basis of the event using the "Kanto/earthquake" template and transmitted to the respective nodes (subscriber accommodation nodes CL5 11 and relay nodes CL4 12) or other networks 60 registered as regulation destinations. Consequently, it is possible to quickly carry out congestion regulation.

In other words, information concerning regulation destinations as transmission destination of a congestion control message (a group of subscriber numbers indicating the respective nodes) is registered in a database DB of congestion control server 101 as a template for congestion control in a form attached with appropriate labels. Further, regulation amounts corresponding to types of urgent events are simultaneously registered for the respective events in the database DB as a template for congestion control. When a highly urgent event occurs, a regulation amount corresponding to a type of a relevant event is selected and a label for a regulation object area is selected out of the template for congestion control in the database DB. The regulation amount and the label are applied to corresponding spaces of the congestion control message, whereby the congestion control message is immediately generated and regulation measures are quickly executed.

By applying the congestion control method described in this embodiment, it is possible to immediately carry out an appropriate congestion control operation against occurrence of a highly urgent event.

Ninth Embodiment

An audit function for a congestion control state prepared as one of measures against a communication failure of a link between congestion control server 101 and nodes (subscriber accommodation nodes CL5 11 and relay nodes CL4 12) is explained.

In congestion control system 100 explained in the respective embodiments described above, when a communication failure (e.g., communication link disconnection or breakdown of a router) occurs in a link between congestion control server 101 and the nodes (subscriber accommodation nodes CL5 11 and relay nodes CL4 12), it is likely that inconsistency of congestion control states, i.e., regulated state occur between congestion control server 101 and the nodes (subscriber accommodation nodes CL5 11 and relay nodes CL4 12).

Therefore, congestion control server 101 has an audit function of collecting, when the communication failure between congestion control server 101 and the nodes (subscriber accommodation nodes CL5 11 and relay nodes CL4 12) is restored, congestion control states, i.e., regulated states of the respective nodes (subscriber accommodation nodes CL5 11 and relay nodes CL4 12) and performing, when the congestion control states, i.e., the regulated states are inconsistent with a congestion control state, i.e., a regulated state recognized by congestion control server 101, an operation for matching the states of the respective nodes to the congestion control state, i.e., the regulated states recognized by congestion control server 101. Consequently, it is possible to immediately perform, at the time of recovery from the communication failure, synchronization of the congestion control states, i.e., the regulated states between congestion control server 101 and the nodes (subscriber accommodation nodes CL5 11 and relay nodes CL4 12).

Tenth Embodiment

An example of a congestion control operation for adjacent nodes by congestion control server 101 at the time when failure notification is received from nodes (subscriber accommodation nodes CL5 11 and relay nodes CL4 12) is explained.

In congestion control system 100 explained in the respective embodiments described above, in some case, congestion control server 101 receives notification of a failure (e.g., an excess of a CPU usage rate, exhaustion of memory resources, or a failure of hardware), which substantially affects an operation, from any one of the nodes (subscriber accommodation nodes CL5 11 and relay nodes CL4 12) of VoIP network 10. In such a case, in the technique in the past, a maintenance person needs to manually perform operation for regulating an incoming call of a control message that flows into the node in which the failure has occurred. However, it is likely that the control message transmitted through the failure node is lost in a period from the occurrence of the failure in the node until the maintenance person finishes manually regulating the incoming call. This deteriorates a quality of a communication service.

Therefore, in this embodiment, when the failure notification is received from the node, congestion control server 101 can transmit, using network topology information owned by congestion control server 101, a congestion control message for instructing respective adjacent nodes, which are connected to the node in which the failure has occurred, to immediately regulate transmission of control messages to the node. Thereafter, when the failure is restored in the node, in which the failure has occurred, congestion control server 101 transmits a congestion control message for instructing the respective adjacent nodes in the regulated state to release the regulation.

In some case, a service network is formed by network topology in which respective nodes are connected to plural adjacent nodes. In such a case, when occurrence of a failure of a specific node is notified, congestion control server 101 may create a congestion control message for controlling a transfer route of a control message, which is transmitted through the specific node in which the failure has occurred, to be bypassed to another node and transmit the congestion control message to adjacent nodes connected to the specific node.

By automatically carrying out the congestion control described above, it is possible to reduce likelihood of a loss of a control message and maintain a quality of a communication service at a stable level.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims. It goes without saying that the congestion control processing in the above description can also be carried out as a computer-executable program and the congestion control program can be recorded in a computer-readable recording medium and used.

What is claimed is:

1. A congestion control system for controlling network congestion within a service network, the service network formed on an Internet Protocol (IP) network carries out a plurality of communication services over the IP network, the service network having a two-layer structure, such that when user terminals that are connected to the IP network are divided by geographical area, subscriber accommodation nodes on the service network that accommodate the user terminals are present in geographical areas of the user terminals, and such that relay nodes of the service network relay information among the subscriber accommodation nodes, the congestion control system comprising:

an edge router to route, as control messages, processing requests for selected communication services received from the user terminals to the subscriber accommodation nodes of the service network that accommodate the user terminals; and, a congestion control server to control congestion of the subscriber accommodation nodes and the relay nodes, wherein a selected subscriber accommodation node of the subscriber accommodation nodes is to detect when congestion occurs or is about to occur in the selected subscriber accommodation node due to a number of the control messages that have already been routed to the selected subscriber accommodation node, and is to in response transmit a notification to the congestion control server, wherein the congestion control server is to receive the notification from the selected subscriber accommodation node and in response is to transmit a congestion control message for regulating the congestion to the edge router, and wherein the edge router is to receive the congestion control message, and in response is to regulate routing of further of the control messages to the selected subscriber accommodation node to reduce or prevent the congestion within the selected subscriber accommodation node.

2. The congestion control system of claim 1, wherein the congestion control message is a first congestion control message, and the notification is a first notification, wherein the congestion control server is to transmit, in response to receiving the first notification from the selected subscriber accommodation node, a second congestion control message to a selected relay node of the relay nodes, wherein the selected relay node is to receive the second congestion control message, and in response is to also regulate routing of further of the control messages to the selected subscriber accommodation node to reduce or prevent the congestion within the selected subscriber accommodation node, wherein the selected subscriber accommodation node is to further detect when the congestion no longer occurs or is no longer about to occur in the selected subscriber accommodation node due to the number of the control messages that have already been routed to the selected subscriber accommodation node, and is to in response transmit a second notification to the congestion control server, wherein the congestion control server is to transmit, in response to receiving the second notification from the selected subscriber accommodation node, a third congestion control message to the selected relay node, and wherein the selected relay node is to receive the third congestion control message, and in response is to stop regulating routing of further of the control messages to the selected subscriber accommodation node.

3. The congestion control system of claim 1, wherein the congestion control message is a first congestion control message, and the notification is a first notification, wherein the congestion control server is to transmit, in response to receiving the first notification from the selected subscriber accommodation node, a second congestion control message to one or more of the subscriber accommodation nodes other than the selected subscriber accommodation node, wherein the one or more of the subscriber accommodation nodes are to receive the second congestion control message, and in response are to also regulate routing of further of the control messages to the selected subscriber accommodation node to reduce or prevent the congestion within the selected subscriber accommodation node, wherein the selected subscriber accommodation node is to further detect when the congestion no longer occurs or is no longer about to occur in the selected subscriber accommodation node due to the number of the control messages that have already been routed to the selected subscriber accommodation node, and is to in response transmit a second notification to the congestion control server, wherein the congestion control server is to transmit, in response to receiving the second notification from the selected subscriber accommodation node, a third congestion control message to the one or more of the subscriber accommodation nodes, and wherein the one or more of the subscriber accommodation nodes are to receive the third congestion control message, and in response are to stop regulating routing of further of the control messages to the selected subscriber accommodation node.

4. The congestion control system of claim 1, wherein the congestion control server is to determine as a first parameter a total number of the control messages sent to the selected subscriber accommodation node per time unit, and as a second parameter the total number of the control messages sent to the selected subscriber accommodation node as weighted by an average amount of network traffic within the geographical area of the selected subscriber accommodation node, wherein the congestion control server is to determine a number of the further of the control messages that are permitted to be transmitted to the selected subscriber accommodation node based on the first and the second parameters, wherein the congestion control message is to include the number of the further of the control messages that are permitted to be transmitted to the selected subscriber accommodation node, as has been determined, and wherein the edge router is to regulate routing of the further of the control messages in accordance with the number of the further of the control messages that are permitted to be transmitted to the selected subscriber accommodation node, as has been included within the congestion control message.

5. The congestion control system of claim 2, wherein the congestion control server is to determine as a first parameter a total number of the control messages sent to the selected subscriber accommodation node per time unit, and as a second parameter the total number of the control messages sent to the selected subscriber accommodation node as weighted by an average amount of network traffic within the geographical area of the selected subscriber accommodation node, wherein the congestion control server is to determine a number of the further of the control messages that are permitted to be transmitted to the selected subscriber accommodation node based on the first and the second parameters, wherein the second congestion control message is to include the number of the further of the control messages that are permitted to be transmitted to the selected subscriber accommodation node, as has been determined, and wherein the selected relay node is to regulate routing of the further of the control messages in accordance with the number of the further of the control messages that are permitted to be transmitted to the selected subscriber accommodation node, as has been included within the second congestion control message.

6. The congestion control system of claim 2, wherein the selected relay node comprises:

an operation system; and, a standby system, wherein where the selected relay node enters an excessive load state such that the operation system selected relay node is unable to relay the notification from the selected subscriber accommodation node to the congestion control server, the operation system switches to the standby system, and the standby system then relays the notification from the selected subscriber accommodation node to the congestion control server.

7. The congestion control system of claim 1, wherein the service network is a first service network, and the selected subscriber accommodation node is also part of a second service network, and wherein the congestion control server imports information regarding congestion within the second service network from a corresponding congestion control server for the second service network, and exports information regarding congestion within the first service network to the corresponding congestion control server for the second service network, such that the congestion within the first service network is regulated in a manner that takes into account the congestion within the second service network, and such that the congestion within the second service network is regulated in a manner that takes into account the congestion within the first service network.

8. The congestion control system of claim 1, wherein the congestion control server is to determine a start time of a period of time in which the congestion is to occur within the selected subscriber accommodation node, wherein the congestion control message is to include the start time of the period of time in which the congestion is to occur within the selected subscriber accommodation node, and wherein the edge router is to begin routing of the further of the control messages to the selected subscriber accommodation node where a current time equals to the start time.

9. The congestion control system of claim 1, wherein the edge router is to regulate routing of further of the control messages to the selected subscriber accommodation node by regulating only opening of new communication sessions at the selected subscriber accommodation node and not existing communication sessions at the selected subscriber accommodation node.

10. A congestion control method for controlling network congestion within a service network, the service network formed on an Internet Protocol (IP) network and for carrying out a plurality of communication services over the IP network, the service network having a two-layer structure, such that when user terminals that are connected to the IP network are divided by geographical area, subscriber accommodation nodes on the service network that accommodate the user terminals are present in geographical areas of the subscriber accommodation nodes, and such that relay nodes of the service network relay information among the subscriber accommodation nodes, the congestion control method comprising:

routing, by an edge router, control messages corresponding to processing requests for selected communication services received from the user terminals, to the subscriber accommodation nodes of the service network that accommodate the user terminals;

controlling congestion of the subscriber accommodation nodes and the relay nodes, by a congestion control server;

detecting, by a selected subscriber accommodation node of the subscriber accommodation nodes, when congestion occurs or is about to occur in the selected subscriber accommodation node due to a number of the control messages that have already been routed to the selected subscriber accommodation node, and in response transmitting a notification to the congestion control server;

receiving, by the congestion control server, the notification from the selected subscriber accommodation node, and in response transmitting a congestion control message for regulating the congestion to the edge router; and, receiving, by the edge router, the congestion control message, and in response to regulating routing of further of the control messages to the selected subscriber accommodation node to reduce or prevent the congestion within the selected subscriber accommodation node.

11. The congestion control method of claim 10, wherein the congestion control message is a first congestion control message, and the notification is a first notification, and wherein the congestion control method further comprises:

transmitting, by the congestion control server, in response to receiving the first notification from the selected subscriber accommodation node, a second congestion control message, to a selected relay node of the relay nodes;

receiving, by the selected relay node, the second congestion control message, and in response also regulating routing of further of the control messages to the selected subscriber accommodation node to reduce or prevent the congestion within the selected subscriber accommodation node;

detecting, by the selected subscriber accommodation node, when the congestion no longer occurs or is no longer about to occur in the selected subscriber accommodation node due to the number of the control messages that have already been routed to the selected subscriber accommodation node, and in response transmitting a second notification to the congestion control server;

transmitting, by the congestion control server, in response to receiving the second notification from the selected subscriber accommodation node, a third congestion control message to the selected relay node; and, receiving, by the selected relay node, the third congestion control message, and in response stopping regulation of routing of further of the control messages to the selected subscriber accommodation node.

12. The congestion control method of claim 10, wherein the congestion control message is a first congestion control message, and the notification is a first notification, and wherein the congestion control method further comprises:

transmitting, by the congestion control server, in response to receiving the first notification from the selected subscriber accommodation node, a second congestion control message to one or more of the subscriber accommodation nodes other than the selected subscriber accommodation node;

receiving, by the one or more of the subscriber accommodation nodes, the second congestion control message, and in response regulating routing of further of the control messages to the selected subscriber accommodation node to reduce or prevent the congestion within the selected subscriber accommodation node;

detecting, by the selected subscriber accommodation node, when the congestion no longer occurs or is no longer about to occur in the selected subscriber accommodation node due to the number of the control messages that have already been routed to the selected subscriber accommodation node, and in response transmitting a second notification to the congestion control server;

transmitting, by the congestion control server, in response to receiving the second notification from the selected subscriber accommodation node, a third congestion control message to the one or more of the subscriber accommodation nodes; and, receiving, by the one or more of the subscriber accommodation nodes the third congestion control message, and in response stopping regulation of routing of further of the control messages to the selected subscriber accommodation node.

13. The congestion control method of claim 10, further comprising:

determining, by the congestion control server, as a first parameter a total number of the control messages sent to the selected subscriber accommodation node per time unit, and as a second parameter the total number of the control messages sent to the selected subscriber accommodation node as weighted by an average amount of network traffic within the geographical area of the selected subscriber accommodation node;

determining, by the congestion control server, a number of the further of the control messages that are permitted to be transmitted to the selected subscriber accommodation node based on the first and the second parameters;

including, within the congestion control message, the number of the further of the control messages that are permitted to be transmitted to the selected subscriber accommodation node, as has been determined; and, regulating, by the edge router, routing of the further of the control messages in accordance with the number of the further of the control messages that are permitted to be transmitted to the selected subscriber accommodation node, as has been included within the congestion control message.

14. The congestion control method of claim 11, further comprising:

determining, by the congestion control server, as a first parameter a total number of the control messages sent to the selected subscriber accommodation node per time unit, and as a second parameter the total number of the control messages sent to the selected subscriber accommodation node as weighted by an average amount of network traffic within the geographical area of the selected subscriber accommodation node;

determining, by the congestion control server, a number of the further of the control messages that are permitted to be transmitted to the selected subscriber accommodation node based on the first and the second parameters;

including, within the second congestion control message, the number of the further of the control messages that are permitted to be transmitted to the selected subscriber accommodation node, as has been determined; and, regulating, by the selected relay node, routing of the further of the control messages in accordance with the number of the further of the control messages that are permitted to be transmitted to the selected subscriber accommodation node, as has been included within the second congestion control message.

15. The congestion control method of claim 11, wherein the selected relay node comprises an operation system and a standby system, and wherein the congestion control method further comprises:

entering, by the selected relay node, an excessive load state such that the operation system selected relay node is unable to relay the notification from the selected subscriber accommodation node to the congestion control server;

in response to entry of the selected relay node into the excessive load state,
switching from the operation system to the standby system; and,
relaying, by the standby system, the notification from the selected subscriber accommodation node to the congestion control server.

16. The congestion control method of claim 10, wherein the service network is a first service network, and the selected subscriber accommodation node is also part of a second service network, and wherein the congestion control method further comprises:

importing, by the congestion control server, information regarding congestion within the second service network from a corresponding congestion control server for the second service network;

exporting, by the congestion control server, information regarding congestion within the first service network to the corresponding congestion control server for the second service network;

regulating the congestion within the first service network in a manner that takes into account the congestion within the second service network; and, regulating the congestion within the second service network in a manner that takes into account the congestion within the first service network.

17. The congestion control method of claim 10, further comprising:

determining, by the congestion control server, a start time of a period of time in which the congestion is to occur within the selected subscriber accommodation node;

including, within the congestion control message, the start time of the period of time in which the congestion is to occur within the selected subscriber accommodation node; and, regulating, by the edge router, routing of the further of the control messages to the selected subscriber accommodation node beginning when a current time equals to the start time.

18. The congestion control method of claim 10, further comprising:

regulating, by the edge router, routing of further of the control messages to the selected subscriber accommodation node by regulating only opening of new communication sessions at the selected subscriber accommodation node and not existing communication sessions at the selected subscriber accommodation node.

* * * * *